(12) United States Patent
Cypher et al.

(10) Patent No.: US 10,311,161 B2
(45) Date of Patent: *Jun. 4, 2019

(54) INTERACTIVE DISPLAYS BASED ON USER INTEREST

(71) Applicant: eBay Inc., San Jose, CA (US)

(72) Inventors: Healey Cypher, San Francisco, CA (US); Tracy Ogishi, Redwood City, CA (US); Darren Endo, Walnut Creek, CA (US); Michael Franklin, Marina del Rey, CA (US); Lars Wensel, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/578,383

(22) Filed: Dec. 20, 2014

(65) Prior Publication Data

US 2015/0262286 A1 Sep. 17, 2015

Related U.S. Application Data

(60) Provisional application No. 61/952,420, filed on Mar. 13, 2014.

(51) Int. Cl.
*G06Q 30/00* (2012.01)
*G06F 17/30* (2006.01)
(Continued)

(52) U.S. Cl.
CPC ...... *G06F 17/30876* (2013.01); *G06F 3/0482* (2013.01); *G06F 3/0488* (2013.01);
(Continued)

(58) Field of Classification Search
CPC ........... G06Q 30/0601–30/08; G06Q 30/0643; G06Q 30/0641
(Continued)

(56) References Cited

U.S. PATENT DOCUMENTS 7,159,178 B2 1/2007 Vogt et al.
7,271,724 B2 9/2007 Goyal et al.
(Continued)

FOREIGN PATENT DOCUMENTS

CN 202248969 5/2012
CN 106663277 A 5/2017
(Continued)

OTHER PUBLICATIONS

Groeber, Janet, Fittingly social, Mar. 2011, MediaBistro, Inc., 23.2, 94 (Year: 2011).*

(Continued)

*Primary Examiner* — Brittney N Miller
(74) *Attorney, Agent, or Firm* — SBMC

(57) ABSTRACT

Example embodiments of the present disclosure include a system comprising a computer-readable storage medium storing at least one program and a computer-implemented method for providing an interactive graphical user interface (GUI) on an interactive mirror display responsive to user interest. Consistent with some embodiments, the method may include identifying an item of interest to an individual in a retail store and accessing detailed product information for the item from a product database. The method may further include generating the interactive GUI using the detailed product information and causing the interactive GUI to be presented to the individual on the interactive mirror display.

20 Claims, 20 Drawing Sheets

(51) Int. Cl.
| | |
|---|---|
| *G06Q 30/02* | (2012.01) |
| *G06Q 30/06* | (2012.01) |
| *G06Q 50/00* | (2012.01) |
| *G06F 3/0482* | (2013.01) |
| *G06F 3/0484* | (2013.01) |
| *G06K 7/10* | (2006.01) |
| *G06K 7/14* | (2006.01) |
| *G06Q 10/08* | (2012.01) |
| *G06F 3/0488* | (2013.01) |

(52) U.S. Cl.
CPC ..... *G06F 3/04847* (2013.01); *G06K 7/10237* (2013.01); *G06K 7/10366* (2013.01); *G06K 7/1443* (2013.01); *G06Q 10/087* (2013.01); *G06Q 30/0251* (2013.01); *G06Q 30/0261* (2013.01); *G06Q 30/0269* (2013.01); *G06Q 30/0623* (2013.01); *G06Q 30/0641* (2013.01); *G06Q 30/0643* (2013.01); *G06Q 50/01* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 8,982,109 | B2 | 3/2015 | Vilcovsky et al. |
| 9,665,906 | B2 | 5/2017 | Adeyoola et al. |
| 9,805,131 | B2 | 10/2017 | Cypher et al. |
| 9,886,653 | B2 | 2/2018 | Bhardwaj et al. |
| 9,910,927 | B2 | 3/2018 | Healey et al. |
| 9,990,438 | B2 | 6/2018 | Cypher et al. |
| 10,083,243 | B2 | 9/2018 | Cypher et al. |
| 2001/0026272 | A1 | 10/2001 | Feld et al. |
| 2002/0045959 | A1 | 4/2002 | Van Overveld |
| 2002/0130178 | A1 | 9/2002 | Wan et al. |
| 2002/0196333 | A1 | 12/2002 | Gorischek |
| 2004/0039592 | A1 | 2/2004 | Shima |
| 2004/0078301 | A1 | 4/2004 | Illsley et al. |
| 2006/0036485 | A1 | 2/2006 | Duri et al. |
| 2007/0182555 | A1 | 8/2007 | Walker et al. |
| 2008/0167946 | A1 | 7/2008 | Bezos et al. |
| 2008/0306756 | A1 | 12/2008 | Sorensen et al. |
| 2009/0051699 | A1 | 2/2009 | Posa et al. |
| 2009/0059175 | A1* | 3/2009 | Le Quesne ............ G06F 3/042 353/28 |
| 2010/0005105 | A1 | 1/2010 | Zhang et al. |
| 2010/0030578 | A1 | 2/2010 | Siddique et al. |
| 2010/0177938 | A1* | 7/2010 | Martinez ............ G06K 9/00677 382/118 |
| 2011/0040602 | A1* | 2/2011 | Kurani ................. G06Q 30/02 705/7.32 |
| 2011/0112890 | A1* | 5/2011 | Chu ....................... G06Q 30/02 705/7.33 |
| 2011/0199294 | A1 | 8/2011 | Vilcovsky |
| 2011/0270618 | A1 | 11/2011 | Banerjee et al. |
| 2012/0109733 | A1 | 5/2012 | Roper et al. |
| 2012/0158482 | A1* | 6/2012 | Paradise ............ G06Q 30/0224 705/14.25 |
| 2012/0166410 | A1* | 6/2012 | Lewin ............... G06Q 30/0251 707/705 |
| 2012/0250951 | A1* | 10/2012 | Chen ................. G06F 21/6245 382/118 |
| 2013/0088154 | A1 | 4/2013 | Van Hoof et al. |
| 2013/0145272 | A1* | 6/2013 | Boggie ................ G06F 3/0487 715/728 |
| 2014/0019300 | A1 | 1/2014 | Sinclair |
| 2014/0136312 | A1 | 5/2014 | Saksena et al. |
| 2014/0279233 | A1* | 9/2014 | Lau ................... G06Q 30/0207 705/26.41 |
| 2014/0344109 | A1* | 11/2014 | Prindle ............. G06Q 30/0633 705/26.8 |
| 2014/0365273 | A1 | 12/2014 | Hurewitz |
| 2015/0170250 | A1 | 6/2015 | Dalal et al. |
| 2015/0245177 | A1 | 8/2015 | Lerner et al. |
| 2015/0262230 | A1 | 9/2015 | Cypher et al. |
| 2015/0262236 | A1 | 9/2015 | Cypher et al. |
| 2015/0262280 | A1 | 9/2015 | Cypher et al. |
| 2015/0262288 | A1 | 9/2015 | Cypher et al. |
| 2016/0117407 | A1 | 4/2016 | Cypher |
| 2016/0117763 | A1 | 4/2016 | Cypher et al. |
| 2018/0011941 | A1 | 1/2018 | Cypher et al. |
| 2018/0246979 | A1 | 8/2018 | Cypher et al. |
| 2019/0005143 | A1 | 1/2019 | Cypher et al. |

FOREIGN PATENT DOCUMENTS

| | | |
|---|---|---|
| EP | 2705474 A1 | 3/2014 |
| KR | 1020090003507 A | 1/2009 |
| KR | 1020110083831 A | 7/2011 |
| WO | 2006047769 A1 | 5/2006 |
| WO | 2009111498 A1 | 9/2009 |
| WO | WO-2012152293 A1 | 11/2012 |
| WO | WO-2015055224 A1 | 4/2015 |
| WO | WO-2015138865 A2 | 9/2015 |
| WO | WO-2015138865 A3 | 9/2015 |

OTHER PUBLICATIONS

"LensCrafters MyLook Magic Mirror", SapientNitro, [Online]. Retrieved from the Internet: <URL: http://awards.designforexperience.com.gallery/2013/interaction-design-innovation/sapientnitro >, (Accessed Jan. 4, 2016), 3 pgs.

"Neiman Marcus' high-tech "memory mirror" transforms shopping experience", [Online]. Retrieved from the Internet: <URL: http://www.cbsnews.com/news/neiman-marcus-high-tech-memory-mirror-transforms-shopping-experience/>, (Jan. 30, 2015), 3 pgs.

"Retail Solution Overview: MemoMi MemoryMirror", Intel Corporation, [Online]. Retrieved from the Internet: <URL: http://www.intel.com/content/www/us/en/internet-of-things/solution-briefs/iot-nrf-memory-mirror-solution-brief.html>, (Accessed Jan. 4, 2016), 6 pgs.

"Smart Mirrors in Fitting Rooms Show Heat in Action", Springwise, [Online]. Retrieved from the Internet: <URL: http://www.springwise.com/smart-mirrors-fitting-rooms-show-off-thermals>, (Oct. 12, 2015), 7 pgs.

Arthur, Rachel, "MemoMi Memroy Mirror captures Attention in Retail Tech Space", Fashion & Mash, [Online]. Retrieved from the Internet: <URL: http://fashionandmash.com/2014/01/24/memomi-memorymirror-captures-attention-in-retail-tech-space/>, (Jan. 24, 2014), 4 pgs.

Bibby, Jayne, "Digital Alternatives", Virtual Mirror by SapientNitro, (Nov. 22, 2011), 2 pgs.

McCarthy, Caroline, "Craving NYC: Its the Magic Mirror", CNET, [Online]. Retrieved from the Internet: <URL: http://www.cnet.com/news/craving-nyc-its-the-magic-mirror/>, (Nov. 29, 2007), 2 pgs.

Murph, Darren, "Accenture Technology finalizing Persuasive Mirror, Behavior Monitoring Systems", [Online]. Retrieved from the Internet: <URL: http://www.engadget.com/2006/10/12/accenture-technology-finalizing-persuasive-mirror-behavior-moni/>, (Oct. 12, 2006), 7 pgs.

Swedberg, Claire, "Roberto Verino Store Allows Shoppers to Wear Garments Virtually", RFID Journal, [Online]. Retrieved from the Internet: <URL: http://www.rfidjournal.com/articles/view?9358, (Mar. 26, 2012), 2 pgs.

"International Application Serial No. PCT/US2015/020396, International Search Report dated Jun. 19, 2015", 2 pgs.

"International Application Serial No. PCT/US2015/020396, Written Opinion dated Jun. 19, 2015", 6 pgs.

"U.S. Appl. No. 14/989,681, First Action Interview—Office Action Summary dated Jun. 23, 2016", 8 pgs.

"U.S. Appl. No. 14/989,681, First Action Interview Pre-Interview Communication dated Apr. 14, 2016", 7 pgs.

"U.S. Appl. No. 14/989,681, Response Filed Aug. 23, 2016 to First Action Interview—Office Action Summary dated Jun. 23, 2016", 23 pgs.

(56) References Cited

OTHER PUBLICATIONS

"U.S. Appl. No. 14/989,681—Response Filed May 16, 2016 to Pre-Interview Communication dated Apr. 14, 2016", 4 pgs.
"U.S. Appl. No. 14/989,703, First Action Interview—Office Action Summary dated Jun. 23, 2016", 10 pgs.
"U.S. Appl. No. 14/989,703, First Action Interview—Pre-Interview Communication dated Apr. 14, 2016", 9 pgs.
"U.S. Appl. No. 14/989,703, Response filed May 16, 2016 to Pre-Interview Communication dated Apr. 14, 2016", 4 pgs.
"U.S. Appl. No. 14/989,703, Response Filed Aug. 23, 2016 to First Action Interview—Office Action Summary dated Jun. 23, 2016", 24 pgs.
"International Application Serial No. PCT/US2015/020396, International Preliminary Report on Patentability dated Sep. 22, 2016", 8 pgs.
"U.S. Appl. No. 14/989,681, Examiner Interview Summary dated Dec. 27, 2016", 6 pgs.
"U.S. Appl. No. 14/989,681, Final Office Action dated Nov. 18, 2016", 24 pgs.
"U.S. Appl. No. 14/989,703, Examiner Interview Summary dated Dec. 27, 2016", 6 pgs.
"U.S. Appl. No. 14/989,703, Final Office Action dated Nov. 1, 2016", 17 pgs.
"U.S. Appl. No. 14/989,703, Response filed Jan. 20, 2017 to Final Office Action dated Nov. 1, 2016". 17 pgs.
"U.S. Appl. No. 14/578,394, Notice of Allowance dated Jun. 27, 2017", 18 pgs.
"U.S. Appl. No. 14/578,401 First Action Interview—Office Action Summary dated Jul. 12, 2017"; 6 pgs.
"U.S. Appl. No. 14/578,405, First Action Interview—Pre-Interview Communication dated Jul. 10, 2017", 14 pgs.
"Korean Application Serial No. 2016-7028367, Response filed Jul. 17, 2017 to Office Action dated May 17, 2017", W/ English Claims, 33 pgs.
Groeber, Janet, "Fittingly social", MediaBistro, Inc., 23.2, 94, (Mar. 2011), 2 pgs.
Young, In Yeo, "Magic Mirror: A Virtual Dressing Room", (2005), 8 pgs.
"U.S. Appl. No. 14/578,401 Response to Pre-Interview Communication filed Apr. 6, 2017", 3 pgs.
"U.S. Appl. No. 14/578,401, Final Office Action dated May 30, 2017", 20 pgs.
"U.S. Appl. No. 14/578,401, First Action Interview—Pre-Interview Communication dated Mar. 6, 2017", 4 pgs.
"U.S. Appl. No. 14/989,681, Examiner Interview Summary dated Jun. 5, 2017", 3 pgs.
"U.S. Appl. No. 14/989,681, Non Final Office Action dated Mar. 8, 2017", 16 pgs.
"U.S. Appl. No. 14/989,681, Response filed Jun. 7, 2017 to Non Final Office Action dated Mar. 8, 2017", 14 pgs.
"U.S. Appl. No. 14/989,703, Examiner Interview Summary dated Jun. 5, 2017", 3 pgs.
"U.S. Appl. No. 14/989,703, Non Final Office Action dated Mar. 8, 2017", 17 pgs.
"U.S. Appl. No. 14/989,703, Response filed to Non Final Office Action dated Mar. 8, 2017", 14 pgs.
"U.S. Appl. No. 14/989,681, Response filed Jan. 24, 2017 to Final Office Action dated Nov. 18, 2016", 17 pgs.
"Korean Serial No. 2016-7028367, Office Action dated May 17, 2017", with English translation of claims, 12 pgs.
Fujimori, "Dressing Room Revolution", North Jersey Media Group Inc., F.1, Jan. 30, 2012, 3 pages.
First Action Interview—Pre-Interview Office Action received for U.S. Appl. No. 14/578,386, dated Sep. 29, 2017, 6 pages.
Response to Pre-Interview Office Action filed on Nov. 9, 2017, for U.S. Appl. No. 14/578,386, dated Sep. 29, 2017, 3 pages.
Notice of Allowability received for U.S. Appl. No. 14/578,394, dated Aug. 16, 2017, 2 pages.
Final Office Action received for U.S. Appl. No. 14/578,401, dated Nov. 9, 2017, 26 pages.
Response to First Action Interview filed on Sep. 26, 2017, for U.S. Appl. No. 14/578,401, dated Jul. 12, 2017, 14 pages.
First Action Interview Office Action received for U.S. Appl. No. 14/578,405, dated Aug. 21, 2017, 15 pages.
Response to Pre-Interview Office Action filed on Aug. 10, 2017, for U.S. Appl. No. 14/578,405, dated Jul. 10, 2017, 3 pages.
Response to First Action Interview filed on Sep. 26, 2017, for U.S. Appl. No. 14/578,405, dated Aug. 21, 2017, 11 pages.
Notice of Allowance received for U.S. Appl. No. 14/989,681, dated Sep. 5, 2017, 16 pages.
Notice of Allowance received for U.S. Appl. No. 14/989,703, dated Aug. 23, 2017, 15 pages.
Response to First Action Interview—Office Action Summary filed on Mar. 8, 2018, for U.S. Appl. No. 14/578,386, dated Dec. 5, 2017, 12 pages.
First Action Interview—Office Action received for U.S. Appl. No. 14/578,386, dated Dec. 5, 2017, 8 pages.
Supplemental Notice of Allowability received for U.S. Appl. No. 14/578,394, dated Oct. 5, 2017, 2 pages.
Response to Office Action filed on Jan. 31, 2018 for Korean Patent Application No. 10-2016-7028367, dated Nov. 30, 2017, 27 pages. (9 pages of English Translation and 18 pages of official Copy).
Office Action received for Korean Patent Application No. 10-2016-7028367, dated Nov. 30, 2017, 24 pages. (8 pages of English Translation and 10 pages of official Copy and 6 pages of English Pending Claims).
Non-Final Office Action received for U.S. Appl. No. 14/578,401, dated Mar. 2, 2018, 26 pages.
Advisory Action received for U.S. Appl. No. 14/578,401, dated Jan. 18, 2018, 2 pages.
Response to Final Office Action filed on Jan. 9, 2018, for U.S. Appl. No. 14/578,401, dated Nov. 9, 2017, 18 pages.
Supplemental Notice of Allowability received for U.S. Appl. No. 14/578,405, dated Apr. 9, 2018, 3 pages.
Supplemental Notice of Allowability received for U.S. Appl. No. 14/578,405, dated Mar. 13, 2018, 3 pages.
Notice of Allowance received for U.S. Appl. No. 14/578,405 dated Jan. 25, 2018, 8 pages.
Notice of Allowance received for U.S. Appl. No. 14/578,405, dated Oct. 30, 2017, 11 pages.
Supplemental Notice of Allowability received for U.S. Appl. No. 14/989,703, dated Jan. 26, 2018, 2 pages.
Supplemental Notice of Allowability received for U.S. Appl. No. 14/989,703, dated Jan. 2, 2018, 2 pages.
Notice of Allowance received for U.S. Appl. No. 14/989,703, dated Dec. 1, 2017, 8 pages.
Notice of Allowance received for U.S. Appl. No. 14/989,681, dated Feb. 2, 2018, 2 pages.
Notice of Allowance received for U.S. Appl. No. 14/989,681, dated Dec. 26, 2017, 9 pages.
Office Action received for European Patent Application No. 12835362.0, dated Mar. 22, 2018, 8 pages.
Response to Office Action received for Canadian Patent Application No. 2,960,234, dated Mar. 22, 2018, 8 pages.
Jahne, et al. Principles of Filter Design—Chapter 6, Handbook of Computer Vision and Applications, 1999, 28 pages.
Canny, John, A Computational Approach to Edge Detection, IEEE Transactions on Pattern Analysis and Machine Intelligence, vol. PAMI-8, No. 6, Nov. 6, 1986, 20 pages.
Arthur, David, k-means++: The Advantage of Careful Seeding, Proceedings of the eighteenth annual ACM-SIAM symposium on Discrete algorithms, Jan. 2007, 9 pages.
Notice of Allowance received for U.S. Appl. No. 14/578,386, dated Jul. 12, 2018, 14 pages.
Final Office Action received for U.S. Appl. No. 14/578,401, dated Jun. 22, 2018, 31 pages.
Response to Non-Final Office Action filed on May 30, 2018, for U.S. Appl. No. 14/578,401, dated Mar. 2, 2018, 18 pages.
Notice of Allowance Received for U.S. Appl. No. 14/989,681 dated May 11, 2018, 6 pages.
Supplemental Notice of Allowability received for U.S. Appl. No. 14/989,681, dated Jun. 26, 2018, 2 Pages.

(56) References Cited

OTHER PUBLICATIONS

Williams, "Magic Mirror Brings Clothes Advice to Changeroom", Burnaby Now: 16, Burnaby, B.C.: Infomart, a division of Postmedia Network Inc., Jul. 23, 2008, 2 pages.
Foreign Notice of Allowance Received for Korean Application No. 2016-7028367, dated Jun. 29, 2018, 5 pages.
Supplemental Notice of Allowability Received for U.S Appl. No. 14/989,681, dated Aug. 16, 2018, 2 pages.
Office Action received for Korean Patent Application No. 10-2018-7027037 dated Dec. 13, 2018, 12 pages (6 pages of Official Copy and 6 pages of English Translation).
Response to Office Action filed on Feb. 13, 2019, for Korean Patent Application No. 2018-7027037, dated Dec. 13, 2018, 12 pages (4 pages of English Pending Claim and 8 pages of Official Copy).

\* cited by examiner

INTERACTIVE DISPLAYS BASED ON USER INTEREST

PRIORITY CLAIM

This application is a non-provisional of, and claims the benefit of priority under 35 U.S.C, § 119(e) from, U.S. Provisional Application Ser. No. 61/952,420, entitled "INTERACTIVE RETAIL STORE," filed on Mar. 13, 2014, which is hereby incorporated by reference.

TECHNICAL FIELD

The present application generally relates to data processing systems. In particular, example embodiments relate to techniques for facilitating interactive commerce and retail transactions.

BACKGROUND

Traditional retail stores typically stock various inventory and items for sale. Commonly, a customer will enter a store, browse through vast amounts of items available for sale, select one of the items that they are interested in, and try that item on in a fitting room (e.g., in the case of clothing). While in the store, and particularly while in the fitting room, the customer generally relies upon a sales associate to provide further information about the items sold in the store, the current inventory of the store, available clothing sizes, compatible items and accessories, and feedback and suggestions related to the items. Once the customer makes the decision to purchase a particular item, the customer proceeds to a checkout aisle in order to pay for the item.

BRIEF DESCRIPTION OF THE DRAWINGS

Various ones of the appended drawings merely illustrate example embodiments of the present invention and cannot be considered as limiting its scope.

DETAILED DESCRIPTION

Figure 1:
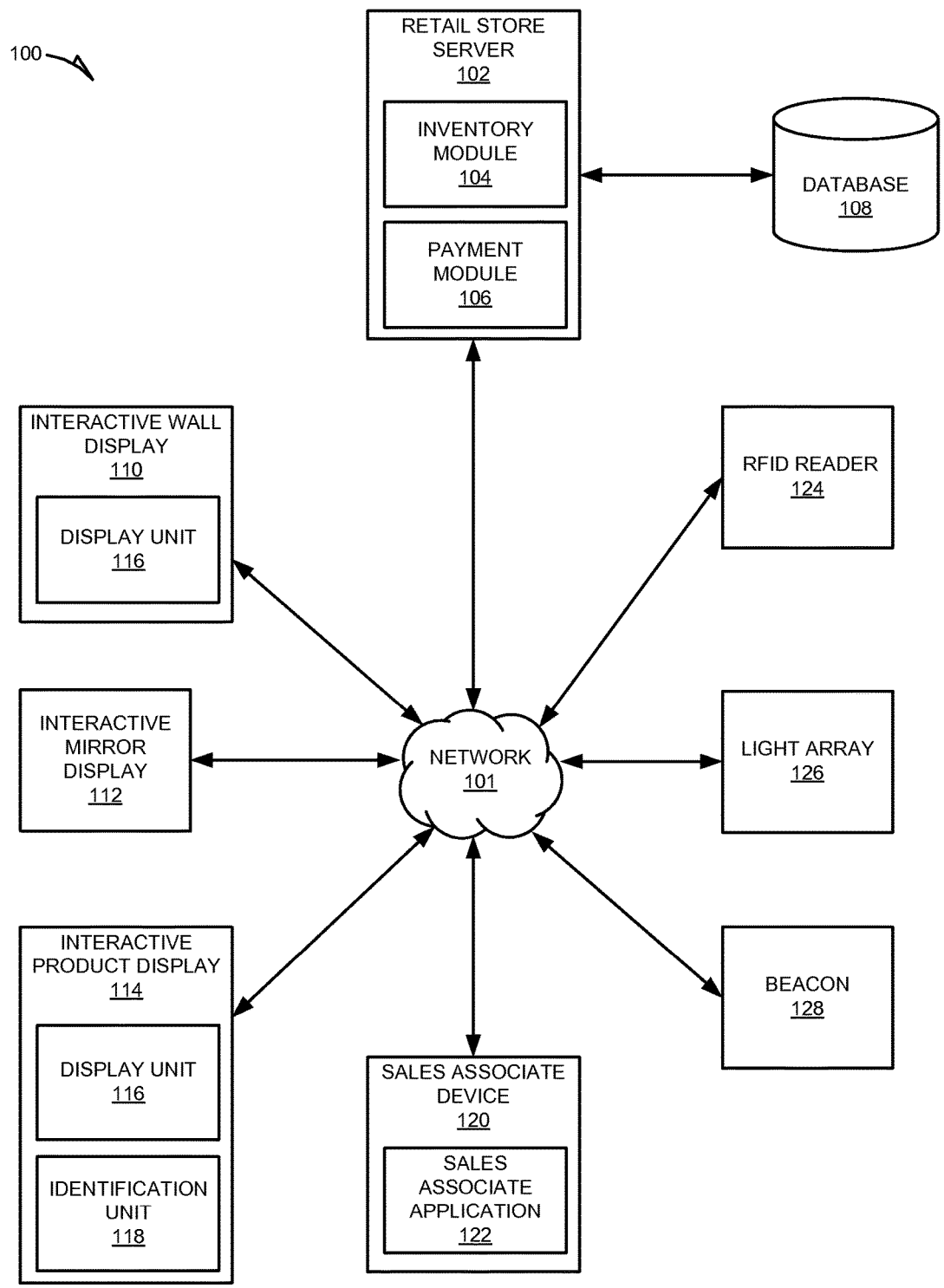
FIG. 1 is a system diagram depicting various functional components of a networked retail store system, which provides interactive functionality to consumers at a retail store, consistent with some embodiments.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

Aspects of the present disclosure involve techniques for providing an interactive in-store retail shopping experience. Consistent with some embodiments, the interactive shopping experience begins with an individual receiving an email inviting her to schedule an appointment with a retail store. Upon receiving the email, the individual may then use interactive elements included in the message to schedule an appointment at the retail store, and select a few items of interest sold at the interactive retail store (e.g., a dress and a handbag). As used herein, an "individual," "consumer," "customer," or "user" may be used interchangeably and refer to a person (e.g., a human) utilizing the services described herein. As used herein, the term "retail store" refers to a physical, brick-and-mortar retail location that sells items to the public. Additionally, as used herein, the terms "items" or "products" refer to goods or services offered for sale at an online or offline marketplace.

Upon arriving at the retail store, the individual may be recognized (e.g., based on a picture associated with the consumer transmitted to a mobile device) and greeted by a sales associate employed at the retail store. Once the identity of the individual is authenticated by the interactive retail store system, a sales associate employed by the retail store may begin preparing a fitting room for the consumer with the items initially selected by the consumer when scheduling the appointment (e.g., the dress and handbag).

Meanwhile, the individual may browse and select additional items offered for sale by the retail store (e.g., a shirt and a pair of jeans). Once the individual makes her way to the fitting room, she is granted access to the fitting room upon being authenticated based on, for example, information provided by the client device of the user, facial recognition, a password or pin number, or biometric data. The fitting room includes an interactive mirror system that may automatically identify the items brought therein (e.g., the dress, handbag, shirt, and jeans) using, for example, radio frequency identification (RFID) tags affixed to or embedded in the items. The interactive mirror system may appear, at least initially, to the individual as an ordinary fitting room mirror, while also being capable of displaying graphical user interfaces (GUI) with multiple user interface (UI) elements alongside or overlaid upon the reflection of the consumer using an embedded display. For example, the interactive mirror system may display each of the items in the fitting room and may further display suggested additional items such as accessories (e.g., a belt) or alternative items (e.g., alternate colors for the dress).

The interactive mirror also includes a touch-capacitive surface capable of receiving user input and allowing users to interact directly with displayed GUIs. For example, the consumer may be able to request a different size of the jeans from a UI element presented by the interactive mirror system. Upon receiving such input, the interactive mirror may then transmit a notification to a device of a sales associate requesting the alternate size. The interactive mirror system may also have a drawing feature, which allows users to "draw" items on the display (e.g., mustaches, flowers, funny faces).

The interactive mirror system also enables the individual to customize the environment of the fitting room. For example, the consumer may adjust the lighting and the background of her reflection to simulate the environment in which she intends to wear a particular item she is trying on.

After selecting items she wishes to purchase, the individual may leave the fitting room to begin the checkout process. In some embodiments, the individual may complete the purchase of items using her own mobile device. In other embodiments, the individual may complete the transaction using the interactive mirror. In still other embodiments, the consumer may signify which items she intends to purchase by placing them in a designated area of the fitting room (e.g., in a certain corner or on a certain rack), and the purchase may be automatically processed by the retail store.

Once payment for the items has been completed, a sales associate may bring packaging to the individual for the purchased items, and discuss the purchase with the consumer. The sales associate may then use a mobile application to save a record of information discussed with the individual. These records may be kept by the retail store, and used to improve future shopping experiences. These records may also be sent as feedback to a creator of the items (e.g., a designer, a manufacturer, or a producer) to improve future lines.

After leaving the store, the individual may receive a message with a reminder of her experience. The message may, for example, include a record of the items purchased (e.g., an invoice or receipt), a list of all items the consumer tried on (e.g., the jeans, the belt, the dress, and the handbag), a list of other items of interest to the individual (e.g., items she looked at) and suggestions for additional items that may be of interest to the individual. The message may further enable the consumer to purchase any referenced items for later delivery.

If the individual changes her mind about one of the items, she may return to the retail store to return the item. The item may be quickly identified (e.g., using RFID) upon the individual entering the store or at a kiosk with such identification capabilities. Because each item is uniquely identified, the identification of the item also allows for easy identification of the transaction details of the previous purchase. The item return may then be processed using the transaction details of the purchase.

FIG. 1 is a system diagram depicting various functional components of a networked retail store system 100, which provides interactive functionality to consumers at a retail store, consistent with some embodiments. To avoid obscuring the inventive subject matter with unnecessary detail, various functional components (e.g., modules and engines) that are not germane to conveying an understanding of the inventive subject matter have been omitted from FIG. 1. However, a skilled artisan will readily recognize that various additional functional components may be supported by the networked retail store system 100 to facilitate additional functionality that is not specifically described herein. Further, it shall be appreciated that although the various functional components of the networked retail store system 100 are discussed in the singular sense, multiple instances of one or more of the various functional components may be employed.

As illustrated, the networked retail store system 100 includes a retail store server 102 to provide processing capability and external network connectivity to the networked retail store system 100. The retail store server 102 may communicate and exchange data within and outside of the networked retail store system 100 that pertains to various functions and aspects associated with the networked retail store system 100 and its users. For example, the retail store server 102 may include an inventory module 104 that provides inventory tracking services to the networked retail store system 100. The retail store server 102 also includes a payment module 106 that provides a number of payment services and functions to individuals visiting an interactive retail store.

The retail store server 102 is communicatively coupled to a database 108, which stores data such as inventory, transaction histories, and member profiles, for example. The inventory may include a record of each uniquely identified item offered for sale by the retail store. Such records may include detailed product information (e.g., a description, size, price, brand, style, fabric, and color) for each item. The database 108 may include multiple databases that may be either internal or external to the networked retail store system 100.

As illustrated in FIG. 1, the networked retail store system 100 also includes an interactive wall display 110, an interactive mirror display 112, and an interactive product display 114 all configured to communicate with each other and with the retail store server 102 over an internal network 101. As will be discussed in greater detail below, each of the interactive wall display 110, interactive mirror display 112, and the interactive product display 114 may also communicate and exchange data over an external communication network (e.g., the Internet). As shown, the interactive wall display 110 and the interactive product display 114 include at least one display unit 116. The display unit 116 is responsible for the presentation of information to consumers. The display unit 116 may, for example, be a light emitting diode (LED) display capable of presenting simple text, or a visual display device such as a monitor or television that is capable of rendering rich and interactive GUIs to consumers. In some embodiments, the display unit 116 is a touch-capacitive display surface capable of receiving and processing input from individuals.

The interactive product display 114 may also include an identification unit 118 capable of identifying items offered for sale by the retail store to which the networked retail store system 100 is associated. The identification unit 118 may include an RFID reader capable of requesting and retrieving information from RFID tags or other similar devices that are affixed to or embedded in items offered for sale by the retail store.

As illustrated in FIG. 1, the networked retail store system 100 also includes at least one sales associate device 120 (e.g., operated by a sales associate of the retail store) configured to communicate and exchange data over the internal network with the other components of the networked retail store system 100. The sales associate device 120 may be any of a variety of types of computing devices. The sales associate device 120 executes a sales associate application 122 for assisting sales associates in assisting customers. For example, the sales associate application 122 may work in conjunction with the payment module 106 to process payments from individuals. The sales associate application 122 may also work in conjunction with the inventory module 104 to allow associates to monitor the inventory of items at the retail store. In addition, the sales associate application 122 may enable communication with customers using other components of the networked retail store system 100. Further, the sales associate application 122 may enable a sales associate to control the functions of other components of the networked retail store system 100.

The networked retail store system 100 may also be in communication with a client device (not shown) of a customer (e.g., a non-sales associate). Such a device may communicate directly with any of the components of the networked retail store system 100 using the in-store network (e.g., WiFi) or a communication protocol which would allow direct communication with the components (e.g., Bluetooth low energy (BLE) or Near Field Communication (NFC)). In the alternative, a customer's client device may communicate with the networked retail store system 100 using an external network (e.g., the Internet). Further details regarding such a client device are discussed below with respect to FIG. 2.

As illustrated in FIG. 1, the networked retail store system 100 also includes a RFID reader 124, a light array 126, and a beacon 128 configured to communicate and exchange data over the internal network with the other components of the networked retail store system 100. Consistent with some embodiments, RFID tags or similar devices may be affixed to, embedded in, or otherwise associated with items offered for sale (e.g., garments, handbags, jewelry, sunglasses) to uniquely identify the items. The RFID reader 124 may be used to retrieve information from these RFID tags, and in doing so, the RFID reader 124 is capable of identifying items offered for sale. For example, the RFID reader 124 may transmit a response or interrogator signal that, when in range of an RFID tag, causes the RFID tag to provide a response that includes information about the item to which it is affixed. This information may, among other things, include an identifier of the item.

The light array 126 is a collection of network-controllable light bulbs such as the Phillips Hue® light bulb or equivalent. The light array 126 may include a centralized controller or hub that is communicatively coupled to the collection of network-controllable light bulbs and provides an interface to control the settings of the light bulbs. In some embodiments, the light bulbs may be controlled directly without the need for a centralized controller or hub.

The beacon 128 may be a hardware module that broadcasts signals using a low energy data transmission protocol such as BLE, and enables precise indoor geo-location capabilities. Further, the beacon 128 may provide additional contextual interaction and engagement by triggering specific application (e.g., "apps" executing on a client device) functionalities in proximate devices.

Figure 2:
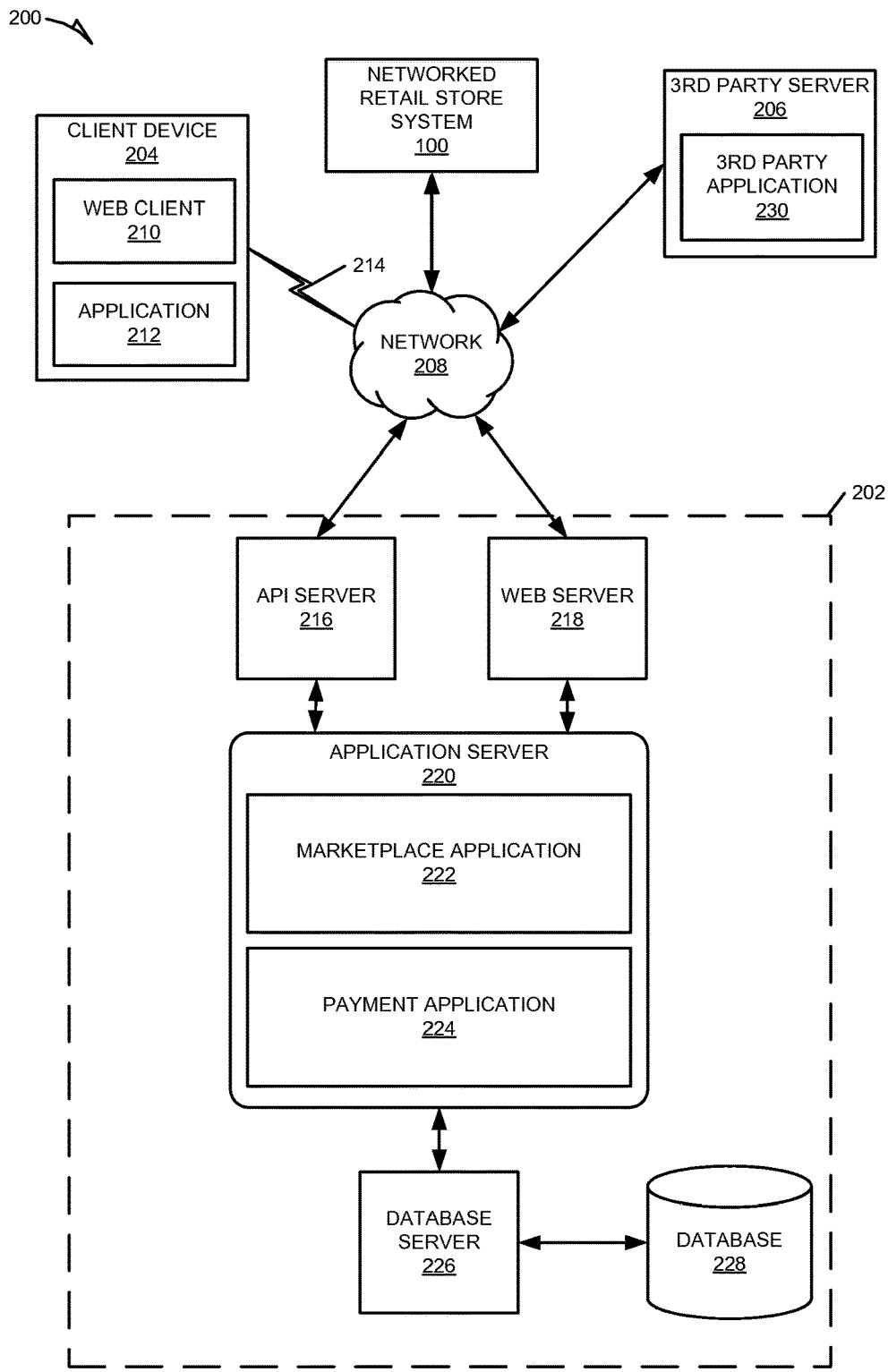
FIG. 2 is a network diagram depicting a network system having a client-server architecture configured for exchanging data between the networked retail store system and a network-based marketplace, consistent with some embodiments.

FIG. 2 is a network diagram depicting a network system 200 having a client-server architecture configured for exchanging data between the networked retail store system 100 and a network-based marketplace 202, consistent with some embodiments. The network system 200 may include a network-based marketplace 202 in communication with the networked retail store system 100, a client device 204 and a third party server 206. It shall be appreciated that although the networked retail store system 100 is shown in FIG. 2 to form part of a service that is separate and distinct from the network-based marketplace 202, it will be appreciated that, in alternative embodiments, the networked retail store system 100 may be included as part of, or function as an extension of, the network-based marketplace 202

The network-based marketplace 202 communicates and exchanges data within the network system 200 that pertains to various functions and aspects associated with the network system 200 and its users. The network-based marketplace 202 may provide server-side functionality, via a network 208 (e.g., the Internet), to the client device 204. The client device 204 may be operated by a user of the network system 200 to exchange data over the network 208. These data exchanges may include transmitting, receiving, and processing data to, from, and regarding content and users of the network system 200. The data may include, but are not limited to: images; video or audio content; user preferences; product and service feedback, advice, and reviews; product, service, manufacturer, and vendor recommendations and identifiers; product and service listings associated with buyers and sellers; product and service advertisements; auction bids; transaction data; and social data, among other things.

In various embodiments, the data exchanged within the network system 200 may be dependent upon user-selected functions available through one or more client or user interfaces (UIs). The UIs may, for example, be specifically associated with a web client 210 (e.g., a browser) executing on the client device 204, and in communication with the network-based marketplace 202. The UIs may also be associated with application 212 executing on the client device 204, such as a client application designed for interacting with the networked retail store system 100, the network-based marketplace 202, or the third party server 206 (e.g., one or more servers or client devices). The application 212 may, for example, provide users with the ability to communicate with sales associates in a retail store, retrieve inventory information, retrieve additional details about items offered for sale, save items for later retrieval, add items to an electronic shopping cart, provide feedback about items, and complete purchases for items.

The client device 204, which may be any of a variety of types of devices (e.g., a smart phone, a tablet computer, a personal digital assistant (PDA), a personal navigation device (PND), a handheld computer, a desktop computer, a laptop or netbook, a wearable computing device, a Global Positioning System (GPS) device, a data enabled book reader, or a video game system console), may interface via a connection 214 with the communication network 208 (e.g., the Internet or wide area network (WAN)). Depending on the form of the client device 204, any of a variety of types of connection 214 and communication networks 208 may be used. For example, the connection 214 may be Code Division Multiple Access (CDMA) connection, a Global System for Mobile communications (GSM) connection, or other type of cellular connection. Such a connection 214 may implement any of a variety of types of data transfer technology, such as Single Carrier Radio Transmission Technology (3xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 208 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or to other types of networks).

In another example, the connection 214 may be Wireless Fidelity (Wi-Fi, IEEE 802.33x type) connection, a Worldwide Interoperability for Microwave Access (WiMAX) connection, or another type of wireless data connection. In such an embodiment, the communication network 208 may include one or more wireless access points coupled to a local area network (LAN), a WAN, the Internet, or other packet-switched data network. In yet another example, the connection 214 may be a wired connection, for example an Ethernet link, and the communication network 208 may be a LAN, a WAN, the Internet, or other packet-switched data network. Accordingly, a variety of different configurations are expressly contemplated.

Turning specifically to the network-based marketplace 202, an API server 216 and a web server 218 are coupled to (e.g., via wired or wireless interfaces), and provide programmatic and web interfaces respectively to, an application server 220. The application server 220 may, for example, host one or more applications, such as a marketplace application 222 and a payment application 224. The application server 220 may further host a plurality of user accounts for users of the network-based marketplace 202, which may be stored in a database 228.

The marketplace application 222 provides a number of marketplace functions and services to users that access the network-based marketplace 202. For example, the marketplace application 222 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services.

The payment application 224 provides a number of payment services and functions to users. For example, the payment application 224 allows users to accumulate value (e.g., in a commercial currency, such as the U.S. dollar, or a proprietary currency, such as "points") in accounts, and then later to redeem the accumulated value for products (e.g., goods or services) that are made available via the marketplace application 222. For some example embodiments, the payment application 224 generally enables transfer of values (e.g., funds, reward points, etc.) from an account associated with one party (referred to as a sender) to another account associated with another party (referred to as a receiver).

As illustrated in FIG. 2, the application server 220 is coupled to a database server 226 that facilitates access to the database 228. In some examples, the application server 220 can access the database 228 directly without the need for the database server 226. In some embodiments, the database 228 may include multiple databases that may be internal or external to the network-based marketplace 202.

The database 228 stores data pertaining to various functions and aspects associated with the network system 200 and its users. For example, user accounts for users of the network-based marketplace 202 may be stored and maintained in the database 228. Each user account may comprise user data that describes aspects of a particular user. The user data may include demographic data, social data, user preferences, and financial information. The demographic data may, for example, include information describing one or more characteristics of a user. Demographic data may, for example, include gender, age, location information, employment history, education history, contact information, familial relations, or user interests. The financial information may, for example, include private financial information of the user such as account number, credential, password, device identifier, user name, phone number, credit card information, bank information, transaction history or other financial information which may be used to facilitate online transactions by the user. The transaction history includes information related to transactions for goods or services (collectively referred to as "items" or "products") that may be offered for sale by merchants using marketplace services provided by the network-based marketplace 202. The transaction history information may, for example, include a description of a product purchased by the user, an identifier of the product, a category to which the product belongs, a purchase price, a quantity, or a number of bids.

The user data may also include a record of user activity. Accordingly, the network-based marketplace 202 may monitor, track, and record the activities and interactions of a user, using one or more devices (e.g., client device 204), with the various modules of the network system 200. Each user session may be stored in the database 228 as part of an activity log and each user session may also be maintained as part of the user data. Accordingly, the user data may include past keyword searches that users have performed, web pages viewed by each user, products added to a user wish list or watch list, products added to an electronic shopping cart, and products that the users own.

FIG. 2 also illustrates a third party application 230 executing on the third party server 206 that may offer one or more services to users of the client device 204. The third party application 230 may have programmatic access to the network-based marketplace 202 via the programmatic interface provided by the application program interface (API) server 216. Similarly, the API server 216 may provide the networked retail store system 100 with programmatic access to the network-based marketplace 202.

The third party application 230 may be associated with an organization that conducts transactions with, or provides services to, the users of the client device 204. For example, the third party application 230 may be associated with a network-based social network platform (e.g., Facebook®, Twitter®, Google+®, Pinterest®, LinkedIn®, or the like) that provides a platform for members to build and maintain social networks and relations among other members. To this end, the social network platform may allow members to share ideas, pictures, posts, activities, events, and interests with other members of the social network. Social network platforms often provide a representation of each member in the form of a social network profile, and also maintain information about various aspects of each of its members, which is referred to herein as "social data." The social data of each member may contain demographic information (e.g., gender, age, relationship status, employment status and history, household size), geographic information (e.g., a hometown, a current location, locations visited), interests and affinities (e.g., items the member "liked"), a list of social network connections, and a history of social network activity of the user.

For purposes of the present disclosure, a social network "connection," also referred to as being "connected" on a social network, may include situations in which there is a reciprocal agreement between members of the social network to be linked on the social network, as well as situations in which there is only a singular acknowledgement of the "connection" without further action being taken by the other member. In the reciprocal agreement situation, both members of the "connection" acknowledge the establishment of the connection (e.g., "friends"). Similarly, in the singular acknowledgement situation, a member may elect to "follow" or "watch" another member. In contrast to the reciprocal agreement, the concept of "following" another member typically is a unilateral operation because it may not call for acknowledgement or approval by the member who is being followed.

For purposes of the present disclosure, "social network activity" collectively refers to user interactions (e.g., creating, sharing, viewing, commenting, providing feedback, or expressing interest) with entries (e.g., text and image posts, links, messages, notes, invitations). Such social network activity may involve entries that are intended for the public at large as well as entries intended for a particular social network connection or group of social network connections. Depending on the social network platform and the privacy settings of its members, the social network activity may be published in an entry and may involve entries such as an activity feed post, a wall post, a status update, a tweet, a pinup, a like, a content share, or a check-in.

It shall be appreciated that although the various functional components of the network system 200 are discussed in the singular sense, multiple instances of one of more of the various functional components may be employed. Moreover, while the network system 200 shown in FIG. 2 employs client-server architecture, the present inventive subject matter is, of course, not limited to such an architecture, and could equally well find application in an event-driven, distributed, or peer-to-peer architecture system, for example. The various functional components of the application server 220 may also be implemented as standalone systems or software programs, which do not necessarily have networking capabilities.

Figure 3:
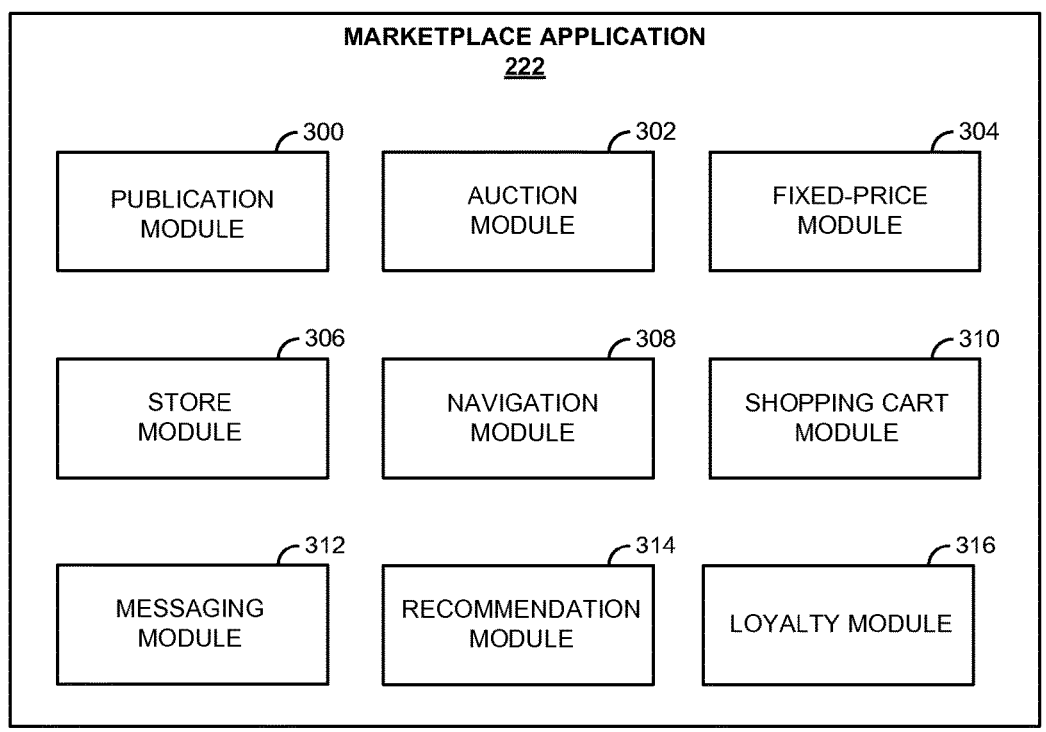
FIG. 3 is a block diagram illustrating an example embodiment of multiple modules forming the marketplace application, which is provided as part of the network system of FIG. 2.

FIG. 3 is a block diagram illustrating an example embodiment of multiple modules forming the marketplace application 222, which is provided as part of the network system 200 of FIG. 2. As is understood by skilled artisans in the relevant computer and Internet-related arts, each component (e.g., a module or engine) illustrated in FIG. 2 may represent a set of logic (e.g., executable software instructions) and the corresponding hardware (e.g., memory and processor) for executing the set of logic. Further, each of the components (e.g., a module or engine) illustrated in FIG. 2 is communicatively coupled (e.g., via appropriate interfaces) to the other components and to various data sources, so as to allow information to be passed between the components or so as to allow the components to share and access common data. Moreover, each component illustrated in FIG. 2 may be hosted on dedicated or shared server machines that are communicatively coupled to enable communications between server machines. The various components illustrated in FIG. 3 may furthermore access the databases 228.

The marketplace application 222 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace application 222 is shown to include a publication module 300 and an auction module 302, which support auction-format listing and price setting mechanisms (e.g., English, Dutch, Vickrey, Chinese, Double, Reverse auctions etc.). The auction module 302 may also provide a number of features in support of such auction-format listings, such as a reserve price feature whereby a seller may specify a reserve price in connection with a listing, and a proxy-bidding feature whereby a bidder may invoke automated proxy bidding.

A fixed-price module 304 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

A store module 306 may allow sellers to group their product listings (e.g., goods and/or services) within a "virtual" store, which may be branded and otherwise personalized by and for the sellers. Such a virtual store may also offer promotions, incentives, and features that are specific and personalized to a relevant seller. In one embodiment, the listings or transactions associated with the virtual store and its features may be provided to one or more users.

Navigation of the network-based marketplace 202 may be facilitated by a navigation module 308. For example, the navigation module 308 may, inter alia, enable keyword searches of listings published via the network-based marketplace 202. The navigation module 308 may also allow users, via a sales-associated UI, to browse various category, catalog, inventory, social network, and review data structures within the network-based marketplace 202. Various other navigation modules 308 (e.g., an external search engine) may be provided to supplement the search and browsing modules.

An electronic shopping cart module 310 is used to create and maintain an electronic shopping cart to be used by users of the network-based marketplace 202 to add and order products (e.g., goods and services) listed by the store module 306. The electronic shopping cart module 310 may also be used to "check out," meaning a user may purchase products in the electronic shopping cart. The electronic shopping cart module 310 may facilitate transactions by automatically finding the products in the electronic shopping cart across at least one or all of a predefined set of vendors, a comparison shopping site, an auction site, etc. In various embodiments, the selection criteria for which vendor or vendors to purchase from may include, but are not limited to, criteria such as lowest cost, fastest shipping time, preferred or highest rated vendors or sellers, or any combination thereof.

A messaging module 312 is responsible for generation and delivery of messages to users of the networked retail store system 100. Such messages, for example, advise users regarding the status of listings at the networked retail store system 100 (e.g., providing "outbid" notices to bidders during an auction process or to provide promotional and merchandising information to users). The messaging module 312 may utilize any one of a number of message delivery networks and platforms to deliver messages to users. For example, the messaging module 312 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

A recommendation module 314 provides item recommendation services and functions to users. The recommendation module 314 may receive requests for recommendations, and, in turn, provide a recommendation to the user based, at least in part, on information about the user maintained as part of the user data. In some embodiments, the recommendation module 314 may automatically generate and provide a recommendation based on the activity of the user. The recommendations provided by the recommendation module 314 may contain one or more items offered for sale that may be of interest to the user. The recommendations may, for example, be based on previous products purchased by the user, a web page viewed by the user, an item given favorable feedback by the user, items owned by the user, or items of interest to the user while shopping in a retail store.

The networked retail store system 100 itself, or one or more parties that transact via the networked retail store system 100, may operate loyalty programs that are supported by a loyalty module 316. For example, a buyer may earn loyalty or promotions points for each transaction established or concluded with a particular seller, and the user may be offered a reward for which accumulated loyalty points can be redeemed.

Figure 4:
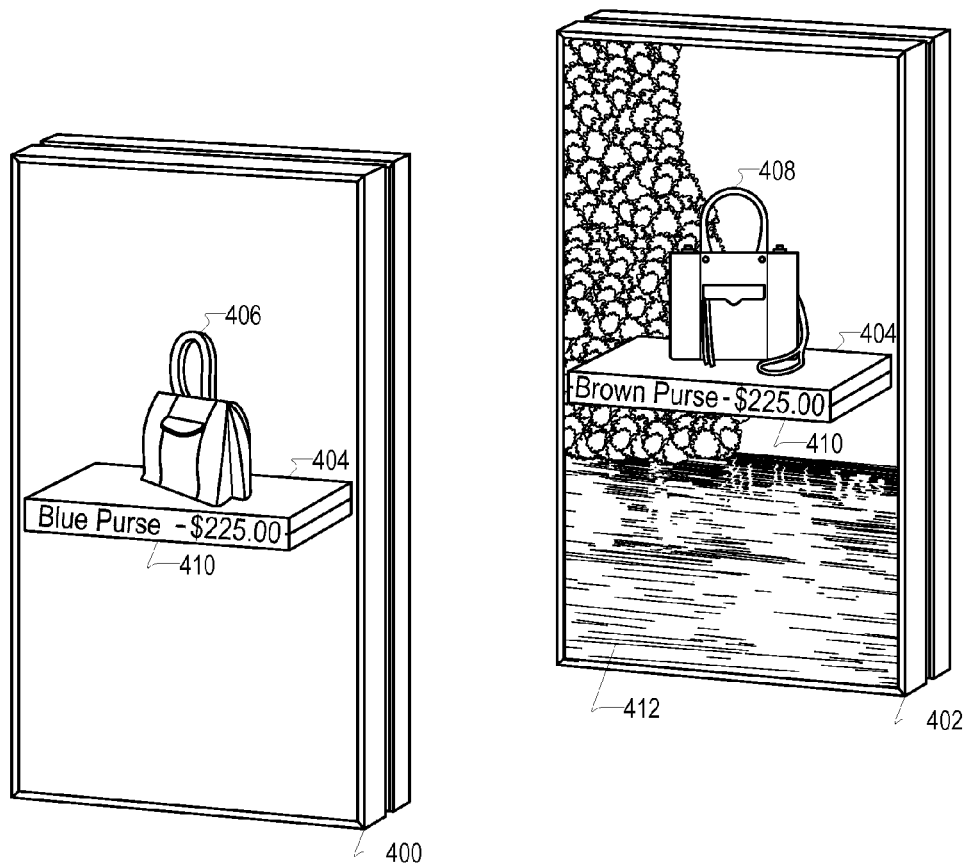
FIG. 4 is a diagram depicting multiple instances of an interactive product display, which is provided as part of the networked retail store system, according to some example embodiments.

FIG. 4 is a diagram depicting multiple instances of the interactive product display 114, according to some example embodiments. In particular, FIG. 4 illustrates interactive product displays 400 and 402. As shown in FIG. 4, each of the interactive product displays 400 and 402 include a shelf 404 to display items 406 and 408, respectively. The shelves 404 may have one or more embedded identification units 118 for identifying the items 406 and 408 placed thereon. For example, an RFID tag may be affixed to the items 406 and 408, and the identification unit 118 may include an RFID reader 124 to obtain information from the RFID tags that includes, inter alia, a unique identifier of the items 406 and 408. In another example, a paper tag with a barcode may be affixed to the items 406 and 408, and the identification unit 118 may make use of a barcode scanner to uniquely identify the items 406 and 408.

Upon identifying the items 406 and 408, the interactive product displays 400 and 402 obtain detailed product information about the items 406 and 408 from the retail store server 102 such as item name, type or other classification, brand, price, size, color, and style. An LED display unit 410 (e.g., an instance of the display unit 116) included in the interactive product displays 400 and 402 presents at least a portion of the detailed product information. In particular, as shown in FIG. 4, the display units 410 of the interactive product displays 400 and 402 present the item name and price.

FIG. 4 also illustrates rendering capabilities of an additional display unit 412 (e.g., a video display tower) of the interactive product display 402 to which the shelf 404 is affixed. As shown, the display unit 412 may display background images that may be varied, for example, to provide a seasonal atmosphere to the retail store in which it is located. In some embodiments, a sales associate may select images for display (e.g., using the sales associate application 122). In some embodiments, a consumer at the retail store may select images for display using an application executing on their mobile device, wherein the application is specifically designed for use with the networked retail store system 100. In some embodiments, the interactive product display 402 automatically selects an image for display based on, for example, attributes of the item being displayed (e.g., style or color), seasonality, location, temperature, activity in the retail store, a selected theme, recent newsworthy events, or upcoming holidays.

Figure 5:
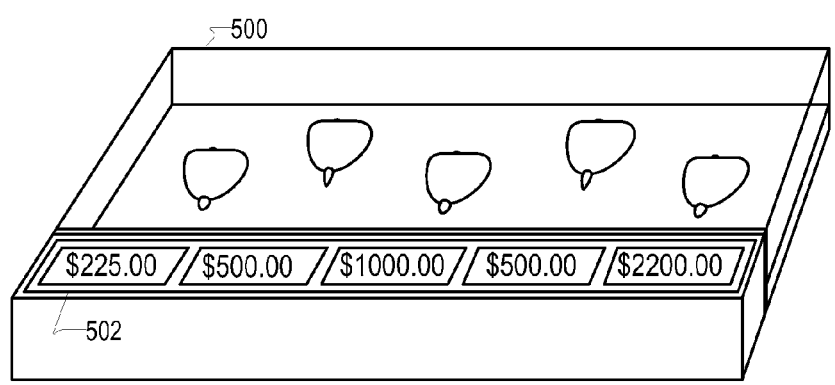
FIG. 5 is a diagram depicting an instance of the interactive product display, according to some alternative example embodiments.

FIG. 5 is a diagram depicting an instance of the interactive product display 114, according to some alternative example embodiments. In particular, FIG. 5 illustrates an interactive product display 500, which in this example embodiment is in the form of a display case having an embedded display unit 502. As shown, the display unit 502 may provide a graphical user interface (GUI) that includes information about each item included within the display case. The display unit 502 of the interactive product display 500 may include a touch-capacitive surface that allows users to interact directly with elements of the GUI. For example, the display unit 502 allows a consumer to select a product from the GUI that is included in the display case, and in turn, the interactive product display 500 causes the item to be illuminated or otherwise visually distinguished from the other items in the display case. As another example, the display unit 502 allows a consumer to interact with a GUI element that is used to call a sales associate for immediate assistance.

Figure 6A:
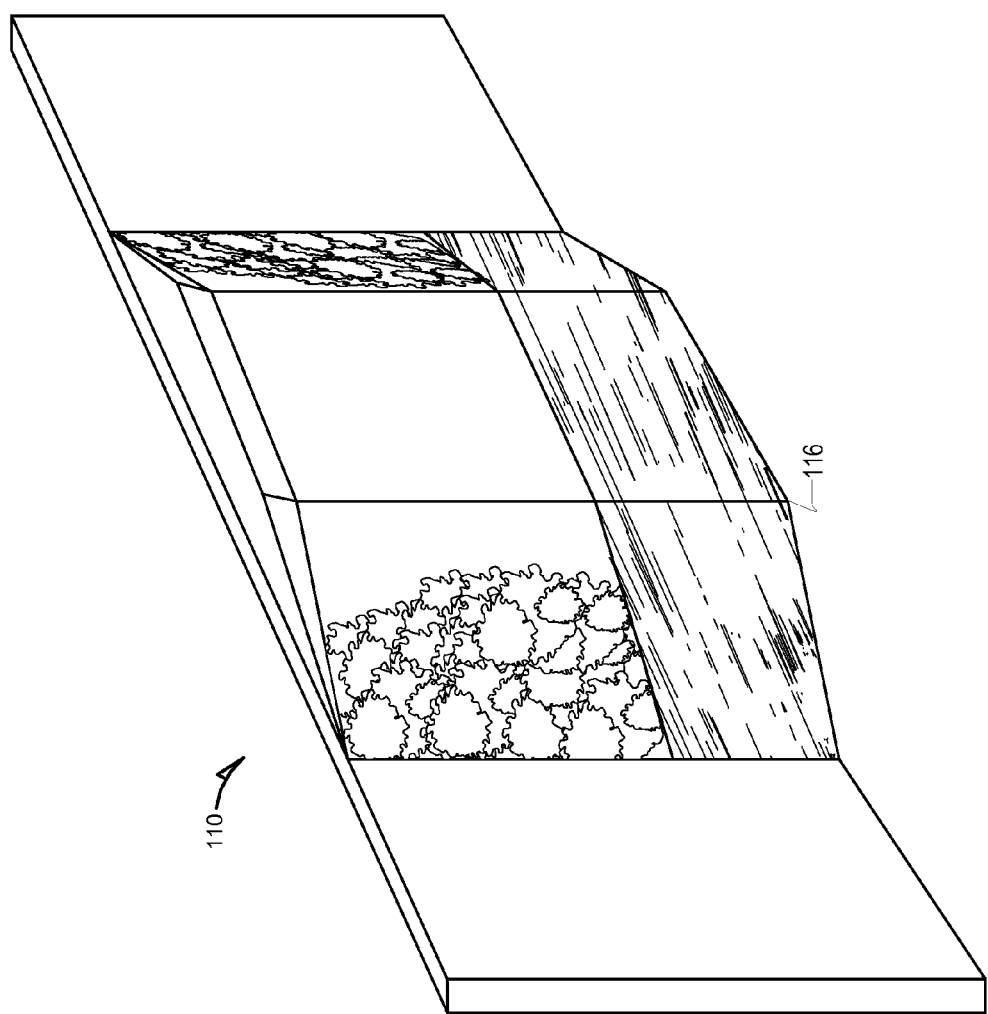
FIG. 6A is a diagram depicting an instance of an interactive wall display, which is provided as part of the networked retail system, according to some example embodiments.

FIG. 6A is a diagram depicting an instance of the interactive wall display 110, according to some example embodiments. The interactive wall display 110 may occupy at least a portion of a wall of the interior or exterior of a retail store. The interactive wall display 110 may be designed such that it provides an aesthetic complement to the interior or exterior of the retail store.

As shown, the display unit 116 of the interactive wall display 110 is an electronic video display that presents various image content (e.g., a background image). The image content may be a single image, a slideshow of images, or a video. Selection of the image content may be based on user input, or may be performed automatically based on for example, seasonality, location, temperature, activity in the retail store, a selected theme, recent newsworthy events, or upcoming holidays.

The interactive wall display 110 may be configured to detect the presence of a proximate individual. To this end, the interactive wall display 110 may employ any number of sensors to detect the presence of an individual such as, for example, motions sensors (e.g., Microsoft Kinect, Passive infrared (PIR), Ultrasonic, Microwave, or Tomographic motion detectors), heat sensors, noise sensors, GPS, or any combination thereof. Consistent with some embodiments, the detection of an individual proximate to the interactive wall display 110 may result in a change in the content being displayed.

Figure 6B:
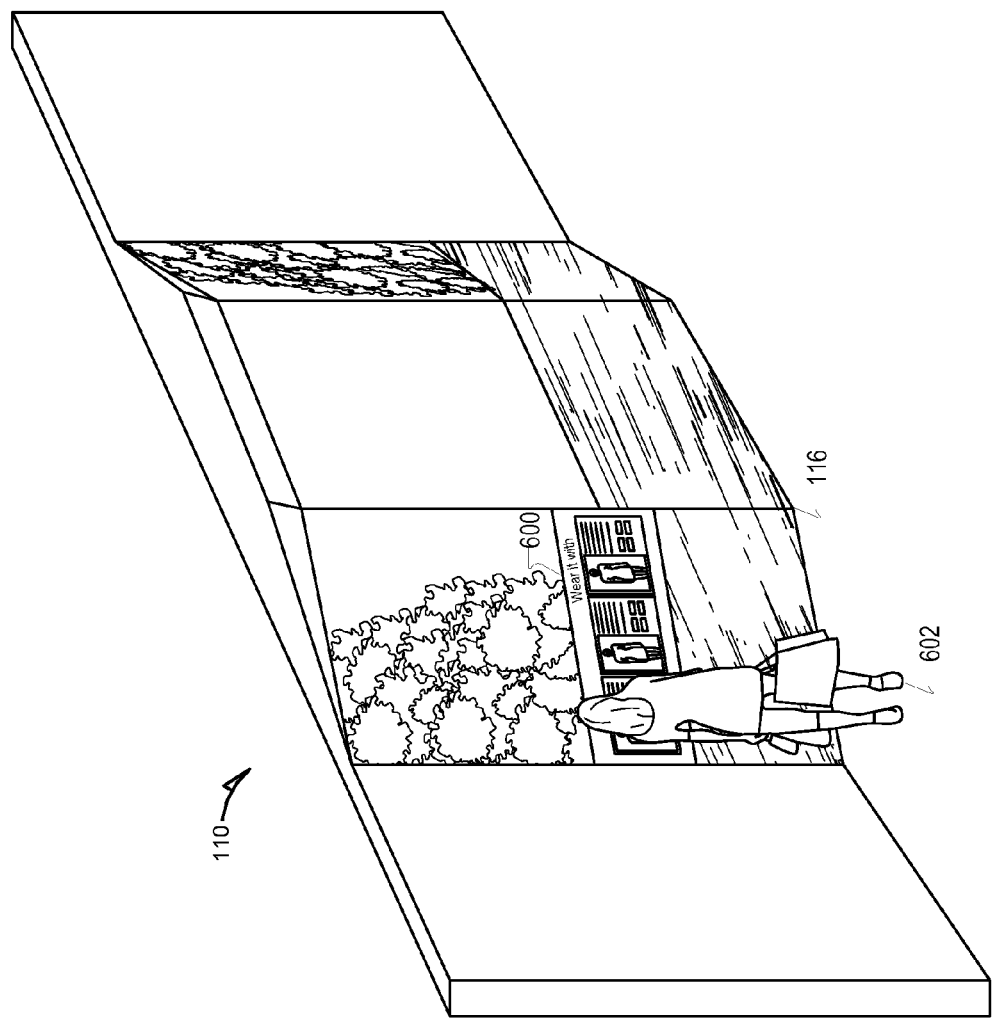
FIG. 6B is a diagram illustrating a graphical user interface (GUI) being presented by the interactive wall display, according to an example embodiment.

For example, upon detecting the presence of a proximate consumer (e.g., based on data received from an embedded motion sensor), the interactive wall display 110 may present a GUI that consumers may interact with (e.g., via a touch-capacitive surface) to browse or purchase items offered for sale by the retail store. As an example, FIG. 6B is a diagram illustrating a GUI 600 being presented by the interactive wall display 110 in response to detecting the presence of an individual 602, according to an example embodiment. In particular, FIG. 6B illustrates the interactive wall display 110 displaying the GUI 600 overlaid upon image content. The GUI 600 identifies items offered for sale within the retail store, and provides detailed product information about such items (e.g., a picture, a description, a price, and available inventory).

In some embodiments, the interactive wall display 110 is configured to identify and authenticate a detected proximate individual. The interactive wall display 110 may identify and authenticate individuals using, for example, RFID, biometric data, a password or other login credentials, a credit card, or the like. Once the individual 602 is identified, the interactive wall display 110 may obtain user data (e.g., maintained by the networked retail store system 100) describing the individual 602. The user data may be used by the interactive wall display 110 to provide a personalized GUI that is customized to the preferences and interests of the user. The personalized GUI may further identify items the individual 602 had previously expressed an interest in either explicitly (e.g., by adding the item to a wish list, or through some other mechanism such as a "like" on Facebook), or implicitly based on their online activity (e.g., adding an item to an electronic shopping cart or repeatedly revisiting a particular item page listing).

Figure 7:
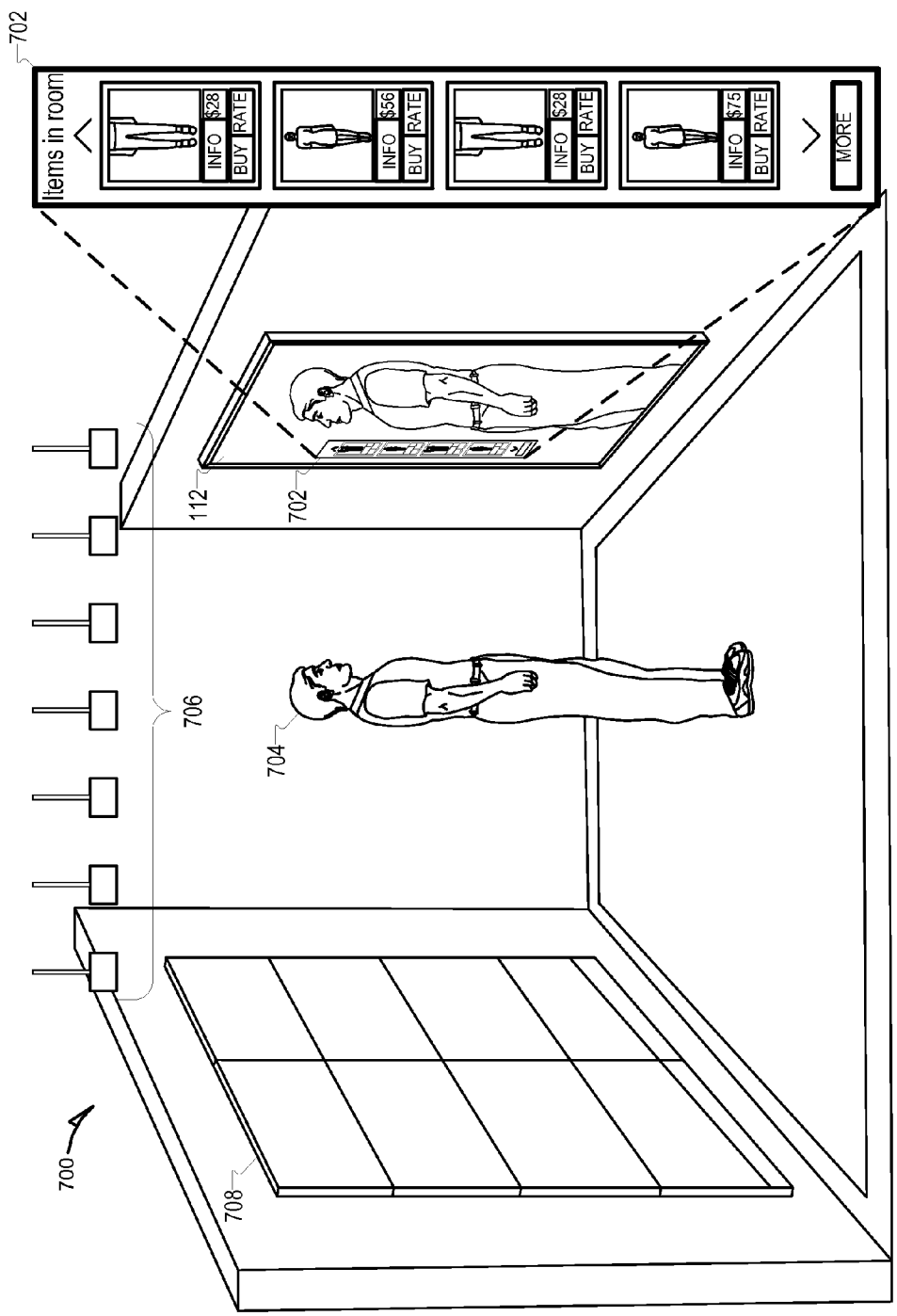
FIG. 7 is a diagram depicting an interactive retail store fitting room having an interactive mirror display, according to some example embodiments.

FIG. 7 is a diagram depicting an interactive retail store fitting room 700 having an interactive mirror display 112, according to some example embodiments. It shall be appreciated that the interactive fitting room 700 is an example retail environment in which the interactive mirror display 112 may operate, and in other embodiments, the interactive mirror display 112 may be deployed in other retail environments such as a storefront, a showroom (e.g., the portion of the retail store in which items are displayed), beside or behind a cash register, a restroom or rest area, a lobby, or a waiting area.

As shown, the interactive mirror display 112 presents a GUI 702 along with an image or reflection of an individual 704 trying on garments in the fitting room 700. The interactive mirror display 112 includes two modes of operation. In the first mode of operation, the interactive mirror display 112 functions as a mirrored surface and as a result, the interactive mirror display 112 may appear to the individual 704, at least initially, as an ordinary fitting room mirror. Upon detecting the presence of the individual 704, the interactive mirror display 112 may transition to the second mode of operation, shown in FIG. 7, in which the interactive mirror display 112 functions as a touch display surface operable to receive user input and present the GUI 702. Accordingly, while the interactive mirror display 112 is in the second mode of operation, the individual 704 may interact directly with the GUI 702 (e.g., expand, collapse, or move to another location) using touch gestures.

The GUI 702 may, for example, identify each item brought into the interactive fitting room 700, and provide detailed product information about the items (e.g., price, brand, color, size). The GUI 702 may further include one or more selectable elements (e.g., buttons) that allow the individual 704 to request assistance from a sales associate. For example, the individual 704 may use the GUI 702 to request an alternative size or color for an item brought into the fitting room 700. The GUI 702 may also allow the individual to browse other items offered for sale in the retail store, and may be used by the individual 704 to provide feedback related to items. The GUI 702 may also include one or more selectable elements (e.g., buttons) to select and solicit feedback from a group of other users. The individual 704 may also use the GUI 702 to complete a purchase of any items brought into the fitting room 700.

In an example of the operation of the interactive mirror display 112, the individual 704 may have previously identified the clothing and accessories she owns (e.g., using the marketplace application 222), and once the individual 704 is authenticated, user data for the individual is accessed and the items the individual owns may be identified therefrom. Images of the items may then be digitally superimposed over the image or reflection of the individual 704 presented by the interactive mirror display 112. In this manner, the individual may be able to see what a particular item being tried on would look like with items she already owns.

In addition, the GUI 702 may allow the individual 704 to specify one or more environmental settings, which may be used by to adjust light settings of an overhead light array 706. The environmental settings may also be operable to adjust background image content presented on a video wall 708 located in the fitting room 700 across from or adjacent to the interactive mirror display 112. The video wall 708 is an electronic video display or screen capable of rendering image content. The rendering of the image content may be for the purpose of recreating or otherwise mimicking an environment in which garments may be worn (e.g., the beach). In some embodiments, the video wall 708 may be an instance of the interactive wall display 110.

Figure 8:
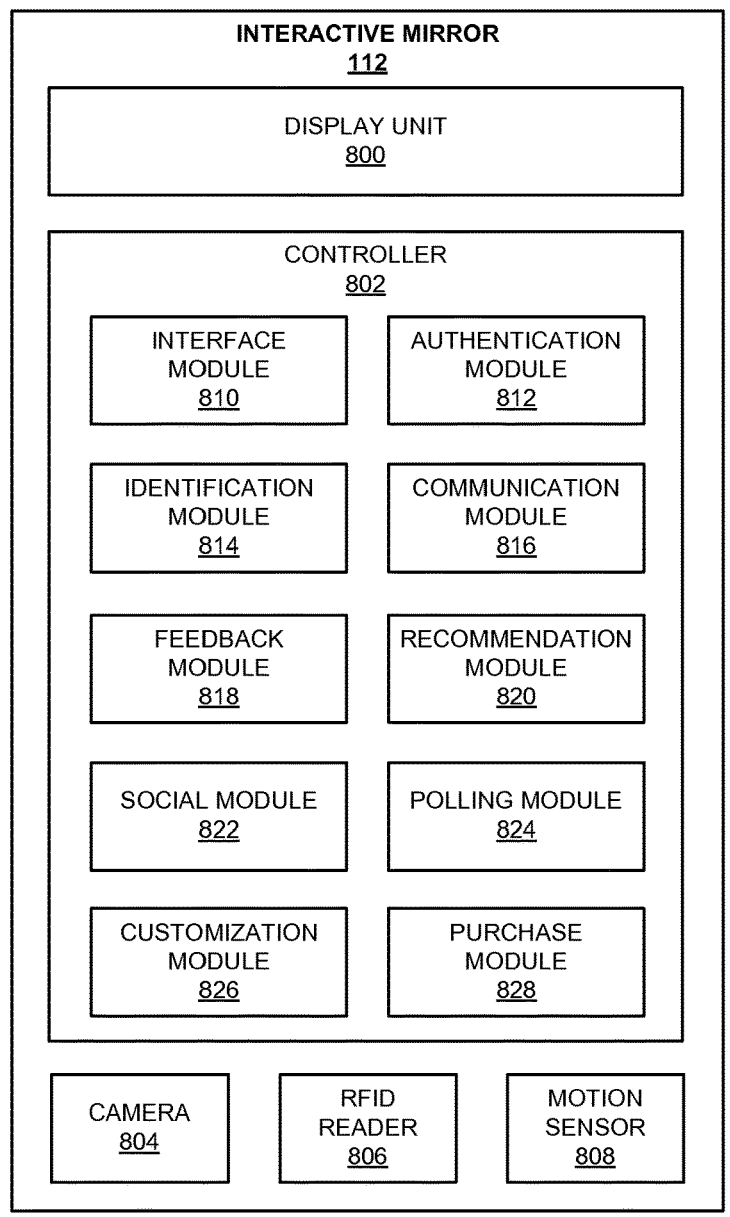
FIG. 8 is a block diagram depicting various functional components of an interactive mirror display, which is provided as part of the networked retail store system, consistent with some embodiments.

FIG. 8 is a block diagram depicting various functional components of the interactive mirror display 112, which is provided as part of the networked retail store system 100, consistent with some embodiments. It shall be appreciated that although the various functional components of the interactive mirror display 112 are discussed in the singular sense, multiple instances of any one of the various functional components may be employed. As shown, the interactive mirror display 112 includes a display unit 800, a controller 802, a camera 804, an RFID reader 806, and a motion sensor 808 all configured to be in communication with each other (e.g., via a bus, a shared memory, a network, or a switch).

The display unit 800 is an electronic visual display that has two modes of operation. The first mode of operation is that of a mirrored surface that reflects an image. In some embodiments, the display unit 800 may include one or more layers that provide a naturally reflective surface, while in some other embodiments, the camera 804 may be employed and configured such that the image feed captured from the camera 804 is presented within the display unit 800 to provide the mirrored reflection. While in the first mode of operation, the display unit 800 may appear to individuals as a common mirror such as those often employed in traditional retail fitting rooms. The second mode of operation is that of a touch screen display surface that is capable of presenting content and receiving user input. In this manner, the display unit 800 enables users to interact directly with what is displayed. While operating in the second mode, the display unit 800 maintains the reflective qualities of the first mode while simultaneously displaying information and enabling user interaction.

The camera 804 is a device for recording visual images. The camera 804 may be configured to record an image feed (e.g., a sequence of visual images), which may be stored or transmitted as image data, consistent with some embodiments. The RFID reader 806 is a device for retrieving information from RFID tags. Consistent with some embodiments, the RFID reader 806 may transmit an encoded radio signal (also referred to as an "interrogator signal" or "interrogator data") to an RFID tag, and the RFID tag may, in turn, respond with an identifier and other information. The motion sensor 808 is a device that is configured to detect moving objects such as people. Accordingly, the motion sensor 808 may employ a number of sensor technologies such as passive infrared (PIR), microwave, ultrasonic, or tomographic motion sensor, for example. In some embodiments, the motion sensor 808 may work in conjunction with the camera 804 to detect moving objects.

The controller 802 is illustrated to include an interface module 810, an authentication module 812, an identification module 814, a communication module 816, a feedback module 818, a recommendation module 820, a social module 822, a polling module 824, a customization module 826, and a purchase module 828, all configured to be in communication with each other (e.g., via a bus, a shared memory, a network, or a switch). As is understood by skilled artisans in the relevant computer and Internet-related arts, each module illustrated in FIG. 8 to be included as part of the controller 802 may represent a set of logic (e.g., executable software instructions) and the corresponding hardware (e.g., memory and processor) for executing the set of logic. Further, any two or more of these modules may be combined into a single module, and the functions described herein for a single module may be subdivided among multiple modules.

The interface module 810 is configured to generate and cause presentation of GUIs and other content (e.g., videos, images, or text) to users. The interface module 810 may work in conjunction with the display unit 800 to process received user input and present information to users. The information may be presented by the interface module 810 so as not to disturb a reflection of an individual utilizing the functionalities of the interactive mirror display 112.

The authentication module 812 is used to identify and authenticate individuals. In some embodiments, the authentication module 812 may authenticate individuals using a standard social network check-in mechanism. The authentication module 812 may also employ Beacon® technology designed by PayPal® to authenticate users, consistent with some embodiments. The authentication module 812 may, in addition or in the alternative, prompt individuals to enter a telephone number, pin number, passcode, or other password associated with an account of the individual maintained by the networked retail store system 100 or the network-based marketplace 202. The authentication module 812 may also employ a variety of other authentication mechanisms, alone or in combination, such as facial recognition, voice recognition, fingerprint recognition, gait or height measurements, or other types of biometric data recognition mechanisms. Upon authenticating an individual, the authentication module 812 may obtain user data about the individual from the retail store server 102 or the network-based marketplace 202. The authentication module 812 may also obtain social data about the authenticated individual from one or more social network platforms (e.g., hosted by the third party server 206).

The product identification module 814 is configured to identify products offered for sale by the retail store in which the interactive mirror display 112 operates. Each item may be uniquely identified and tracked using the inventory module 104 and information stored in the database 108. Each item may be uniquely identified using, for example, an RFID tag, a barcode, a serial number or other such identifiers. Depending upon how each item is uniquely identified, the product identification module 814 may employ a variety of technologies to identify items such as, but not limited to, an RFID reader 806, a barcode scanner, a keypad or other input device to receive an identifier from individuals, or using image processing and analysis techniques to automatically recognize items from images received from a camera.

The communication module 816 is responsible for facilitating communications between individuals and sales associates. Such communications may, for example, include: requests for alternative items (e.g., alternative sizes, colors, or styles); requests for additional items; feedback related to items, the retail store, or sales associate performance; requests for assistance; payment information; and promotions or sales. These communications may be received by or transmitted to any of the functional components of the networked retail store system 100 or the network system 200. Further, the communication module 816 may work in conjunction with the messaging module 312 to transmit messages (e.g., SMS text messages or emails) to client devices of consumers of the retail store.

The feedback module 818 is configured to obtain feedback from consumers related to items. The feedback module 818 may receive feedback information directly from individuals via the touch display screen functionality of the interactive mirror display 112 or the client device 204 of the consumer, from information entered by a sales associate on the sales associate device 120, or from the in-store actions of the individuals (e.g., if a consumer tries on an item but does not purchase it). In some embodiments, the feedback module 818 may work in conjunction with the interface module 810 to present selectable GUI elements to provide feedback related to an item. Such feedback may, for example, indicate that an item was too expensive, the item did not fit properly, or the item was not aesthetically pleasing.

The feedback module 818 may also be configured to track the amount of time an individual wears a particular garment (e.g., while trying the item on in a fitting room) and from that information, the feedback module 818 may determine a metric for the buying intent or interest of the individual with respect to the item. For example, if an individual tries on a shirt for ten seconds and then takes it off, he probably has a lot less interest in shirts of that style than a shirt he tried on for five minutes with various other combinations of clothing.

The feedback module 818 may also track other information useful in determining buying intent and interest in items by individuals. For instance, the feedback module 818 may track the percentage of individuals that try on a particular item and do not purchase. The feedback module 818 may also track the average time all individuals try on a particular garment.

The feedback information obtain by the feedback module 818 may be recorded and stored as user data that is part of a user account of each user of the networked retail store system 100 or the network-based marketplace 202. The feedback information may also be monitored by retail stores and anonymously provided to creators of items (e.g., designers, manufacturers, or producers) to provide real-time, localized, and segmented feedback about how specific items are performing within specific demographics. In this manner, inventory can be shifted from one store to the next in a more rapid manner if there is insight into such behavior. Further, revisions in product lines can be made if items are not converting to sales.

The recommendation module 820 may be configured to provide recommendations for additional items or suggestions for alternative items. In some embodiments, the recommendation module 820 may work in conjunction with the recommendation module 314 of the marketplace application 222 to provide recommendations to individuals for items offered for sale online. Recommendations provided by the recommendation module 820 may be based on previous items purchased by an individual, items owned by the individual, items for which the individual has shown an interest, interests of the individual, or other user data about the individual. Consistent with some embodiments, recommendations provided by the recommendation module 820 may incorporate a retailer's editorial suggestions as well as the preferences and history of the individual.

The social module 822 provides a number of social shopping services to users of the interactive mirror display 112. Consistent with some embodiments, the social module 822 may work in conjunction with the interface module 810 to simultaneously display one or more other users who are in remote locations and have been authenticated by another instance of the interactive mirror display 112. For example, if a group of bridesmaids is trying on bridesmaid dresses in many different locations, they may each go to associated retail stores at the same time to try on the dresses, and share images of themselves wearing the dresses in real-time with other members of the group.

The social module 822 may further work in conjunction with the interface module 810 to provide a GUI that includes a list of a user's social network connections who have authorized them to see their 'feed' from another instance of the interactive mirror display 112. The list of social network connections may be included as part of the social data retrieved from one or more social networks. Upon receiving a selection of one of the social network connections, the social module 822 may provide a communication interface to enable communication between the users. Voice and other means of communication may be integrated to facilitate communication. In this way, people located in different stores or geographies can go 'shopping' with their friends and provide real-time input on buying decisions.

The polling module 824 may be utilized by an individual to receive feedback related to an item he or she has an intention to purchase. To this end, an image of the item is captured from the image feed produced by the camera 804, and is transmitted to computing devices of one or more users for input (e.g., by way of comments, voting, or polling) on the item. In instances where the item is a garment, the image may include the individual wearing the garment. The group that the image is transmitted to may, for example, be social network connections of the individual selected by the user, a subset of the social network connections of the user identified as experts in items of that type, or other users that have experience relative to an item (e.g., design directors or fashionistas), or any combination thereof. The feedback may be tallied and presented in real-time, or be collated and pushed to a client device (e.g., client device 204) of the individual at any time.

In some embodiments, the target audience from which feedback is to be received may be an anonymous target audience. For example, if an individual is trying on a shirt with the intention of wearing it to a club where he intends to attempt to fraternize with females, the anonymous target audience selected by the polling module 824 may be females who are club goers (e.g., as evidenced by social data), regardless of whether these females are part of the social network of the individual. Consistent with these embodiments, a number of anonymizing techniques may be utilized to conceal the identity of the individual. For example, prior to the image of the user being transmitted to the target audience, the individual's face in the image may be blurred or otherwise distorted. As another example, the image itself may have an expiration time so as to provide anonymity to the individual.

The customization module 826 may be used to customize a retail environment in which the interactive mirror display 112 is located (e.g., the fitting room 700). To this end, the customization module 826 may adjust a number of environmental settings that specify the configuration of elements of the retail environment. The configurable elements of the retail environment may include the light array 126, the interactive wall display 110, and an interactive mirror display 112. The environmental settings include light settings and background settings. The light settings control the lighting of the retail environment and may be adjusted to change the brightness, saturation, and hue of the light array (e.g., light array 126) in the retail environment. The background settings specify background images to be displayed, for example, on an electronic video display (e.g., an interactive wall display 110) located behind an individual when facing the interactive mirror display 112.

Consistent with some embodiments, the customization module 826 personalizes retail environments based on user preferences. For example, the customization module 826 may work in conjunction with the interface module 810 to provide a GUI to a user that allows the user to adjust lighting and background settings of the retail environment based on the user's tastes and preferences.

Consistent with some embodiments, the customization module 826 customizes retail environments based on a garment type of a garment or a desired use of a garment being tried on by the individual. For example, if an individual is trying on a cocktail dress to be later worn at a cocktail party, the background (e.g., a display wall located behind the individual) may be changed to resemble a cocktail party, and the lighting can be adjusted to more accurately reflect the lighting of a cocktail party. In this manner, the customized retail environment replicates the environment in which the garment is to be actually used so as to enable the individual to make a better buying decision. The customization module 826 may also perform retail environment personalization in a predictive manner based on, for example, the type of garment, calendar integration, user historical preferences, or other user data.

Consistent with some embodiments, the customization module 826 works in conjunction with the interface module 810 to present an image on the display unit 800 of the individual within a customized environment. That is, using the camera 804 and the motion sensor 808, the outline of the individual may be determined. The interactive mirror display 112 may then replace the remainder of the image outside of the outline with the background image selected by the individual or predicted by the customization module 826 based on the garment type or desired use. From the individual's perspective, the resulting effect is that she sees herself in the "mirror" in a customized environment, but the background itself is not being reflected in the "mirror."

The purchase module 828 is configured to facilitate the purchase of items from the interactive mirror display 112. As such, the purchase module 828 may work in conjunction with the payment module 106 of the retail store server 102 or the payment application 224 (e.g., PayPal) of the network-based marketplace 202 to facilitate the transfer of funds from an account of an individual to an account of the retail store. The purchase module 828 may also be configured to communicate with a client device (e.g., client device 204) of the individual such that the individual may complete purchases from her own device.

Figure 9:
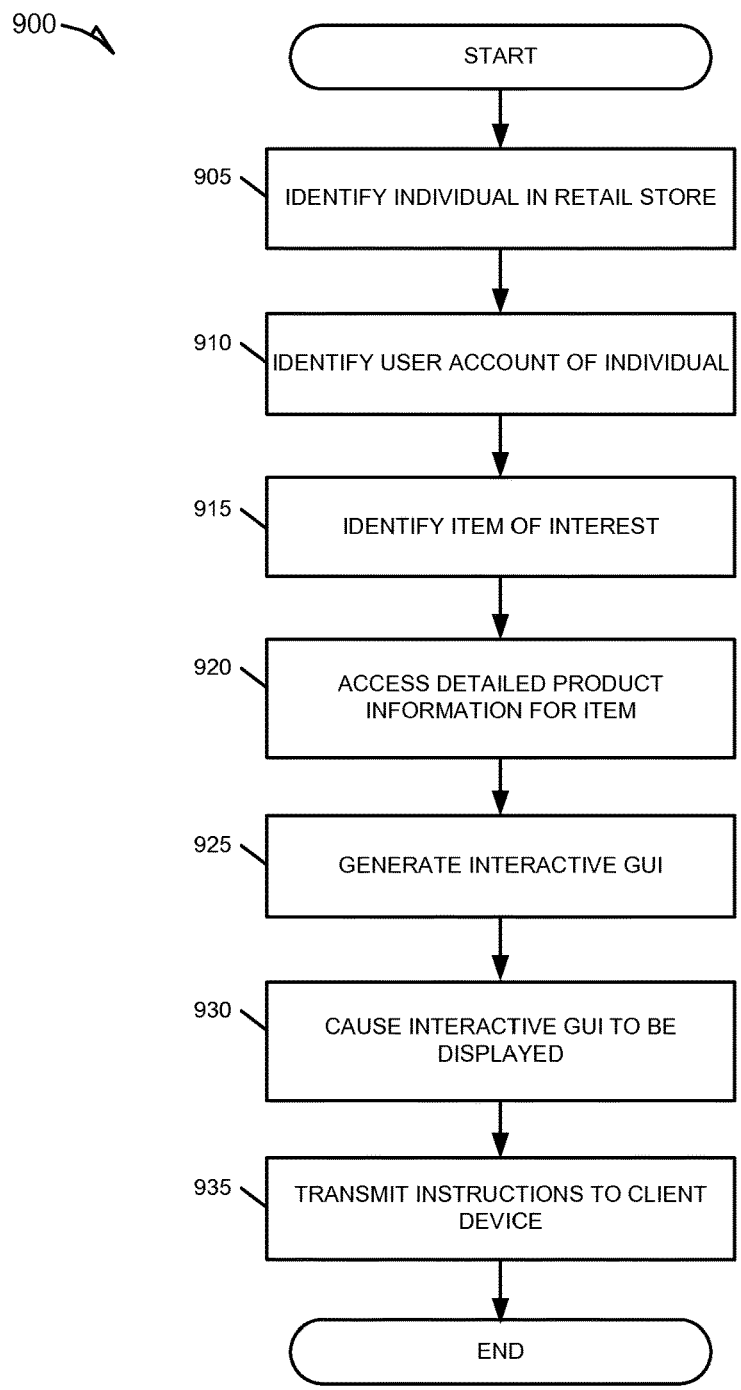
FIG. 9 is a flowchart illustrating a method for providing an interactive GUI, consistent with some embodiments.

FIG. 9 is a flowchart illustrating a method 900 for providing an interactive GUI, consistent with some embodiments. The method 900 may be embodied in computer-readable instructions for execution by a hardware component (e.g., a processor) such that the steps of the method 900 may be performed in part or in whole by the functional components of the interactive mirror display 112, and accordingly, the method 900 is described below, by way of example with reference thereto. However, it shall be appreciated that the method 900 may be deployed on various other hardware configurations and is not intended to be limited to the interactive mirror display 112. For example, the method 900 may be embodied in computer-readable instructions for execution by one or more processors such that the steps of the method 900 may be performed in part or in whole by the interactive display wall 110 or the interactive product display 114.

At operation 905, the authentication module 812 identifies an individual in a retail store. For example, the authentication module 812 may identify the individual by performing facial recognition analysis on image data received from the camera 804. Once the individual is identified, the authentication module 812 may identify a user account of the individual (e.g., maintained by the networked retail store system 100 or the network-based marketplace 202), at operation 910. The identifying of the user account of the individual may, for example, be based on profile image data included in user profile data maintained as part of the user account.

At operation 915, the identification module 814 identifies an item of interest to an individual at a retail store. The item of interest may be identified based on the individual looking at the item (e.g., based on his presence in front of the item as determined by data received from the camera 804 or the motion sensor 808), the individual picking up or holding the item, or the individual bringing the item into a fitting room (e.g., fitting room 700) or other retail environment in which the interactive mirror display 112 is located.

Consistent with some embodiments, the identifying of the item of interest may be based on a signal produced by an RFID tag affixed to the item. For example, based on the known strength of signals produced by the RFID tag at various ranges, the identification module 814 may determine that the individual has moved the item from a first position to a second position (e.g., the individual picked up an item or carried the item from one location to another). In another example, the identification module 814 may detect the presence of an RFID signal in a particular area of the store where such a signal was not previously detected, and based on this detection, the identification module 814 may determine that the individual carried the item into the particular area (e.g., the fitting room 700).

Consistent with some embodiments, the identifying of the item of interest may be based on an analysis of image data received from the camera 804. The image data may include one or more image having visible depictions of the individual and the item. As such, the identifying of the item of interest may include: receiving the image data from the one or more cameras; performing object recognition on the image data to identify the item and the individual according to one of several known image analysis and object recognition techniques (e.g., edge detection, edge matching, grey-scale matching, gradient matching, or pattern recognition); measuring a distance between the identified item and the individual; and determining that the individual is within the predefined distance of the item to ensure that the item is actually of interest to the user.

Upon identifying the item of interest, the identification module 814 accesses detailed product information (e.g., an image, a description, price, category, color, size, style, brand) for the item (e.g., from the database 108), at operation 920. Consistent with some embodiments, in accessing the detailed product information, the identification module 814 may work in conjunction with the RFID reader 806 to transmit interrogator data to an RFID tag affixed to the item, and receive a response from the RFID tag that includes an identifier of the item. The identification module 814 may then use the identifier of the item to retrieve the detailed product information from the database 108.

At operation 925, the interface module 810 generates an interactive GUI using the retrieved detailed product information. Accordingly, the interactive GUI may, for example, include any one of an image, a description, price, category, color, size, style, or a brand of the item. In some embodiments, the interface module 810 may also retrieve one or more coupons or ads (e.g., from the database 108) for inclusion in the interactive GUI. Further, in some embodiments, the interactive GUI may include one or more recommendations for items that are similar or related to the item of interest. Consistent with these embodiments, the recommendation module 820 may generate the one or more recommendations based on user profile information for the individual maintained as part of the individual's user account. Accordingly, the recommendations may be based on items the individual owns, has previously purchased, or has searched for on the network-based marketplace 202.

At operation 930, the interface module 810 causes the interactive GUI to be displayed to the individual on the display unit 800 of the interactive mirror display 112. Consistent with some embodiments, the causing of the interactive GUI to be displayed includes providing a set of computer-readable instructions that causes the interactive mirror display 112 to transition from a mirror surface to a touch display surface operable to receive user input and present the interactive GUI. In other words, the interface module 810 causes the display unit 800 to transition from the first mode of operation (e.g., a mirrored surface) to a second mode of operation (e.g., a touch display surface). The method 900 may, in some embodiments, include transmitting instructions to a client device of the individual to present the interactive GUI at operation 935.

Figure 10:
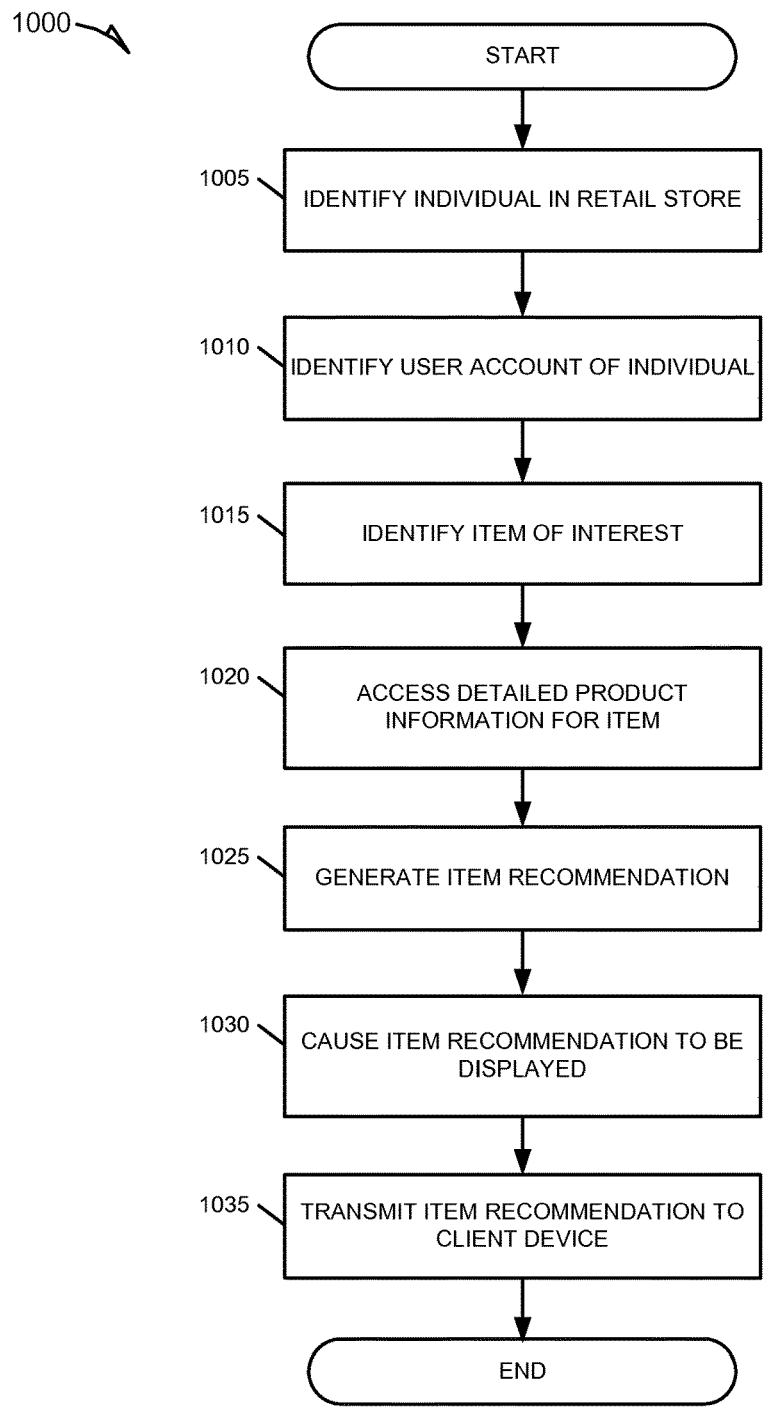
FIG. 10 is a flowchart illustrating a method for providing an item recommendation to an individual, consistent with some embodiments.

FIG. 10 is a flowchart illustrating a method 1000 for providing an item recommendation to an individual, consistent with some embodiments. The method 1000 may be embodied in computer-readable instructions for execution by a hardware component (e.g., a processor) such that the steps of the method 1000 may be performed in part or in whole by the functional components of the interactive mirror display 112, and accordingly, the method 1000 is described below, by way of example with reference thereto. However, it shall be appreciated that the method 1000 may be deployed on various other hardware configurations and is not intended to be limited to the interactive mirror display 112. For example, the method 1000 may be embodied in computer-readable instructions for execution by one or more processors such that the steps of the method 1000 may be performed in part or in whole by the interactive display wall 110 or the interactive product display 114.

At operation 1005, the authentication module 812 identifies an individual in a retail store. For example, the authentication module 812 may identify the individual based on information transmitted by an RFID device worn by or attached to the individual. Once the individual is identified, the authentication module 812 may identify a user account of the individual (e.g., maintained by the networked retail store system 100 or the network-based marketplace 202), at operation 1010. The identifying of the user account of the individual may, for example, be based on profile image data included in user profile data maintained as part of the user account.

At operation 1015, the identification module 814 identifies an item of interest to an individual at a retail store. Upon identifying the item of interest, the identification module 814 accesses detailed product information (e.g., an image, a description, price, category, color, size, style, brand) for the item (e.g., from the database 108), at operation 1020.

At operation 1025, the recommendation module 820 generates an item recommendation for the individual based on the user data and detailed product information of the garment. In some embodiments, the recommendation includes one or more items that are similar to the garment but vary in some aspects such as color, price, style, or brand. In some embodiments, the recommendation includes one or more items that are related to the garment such as accessories or other garments that may be worn with the garment. At operation 1030, the interface module 810 causes the recommendation to be displayed to the user (e.g., on the display unit 800). At operation 1035, the recommendation is transmitted to a client device of the individual using contact information included in the individual's user data.

Figure 11:
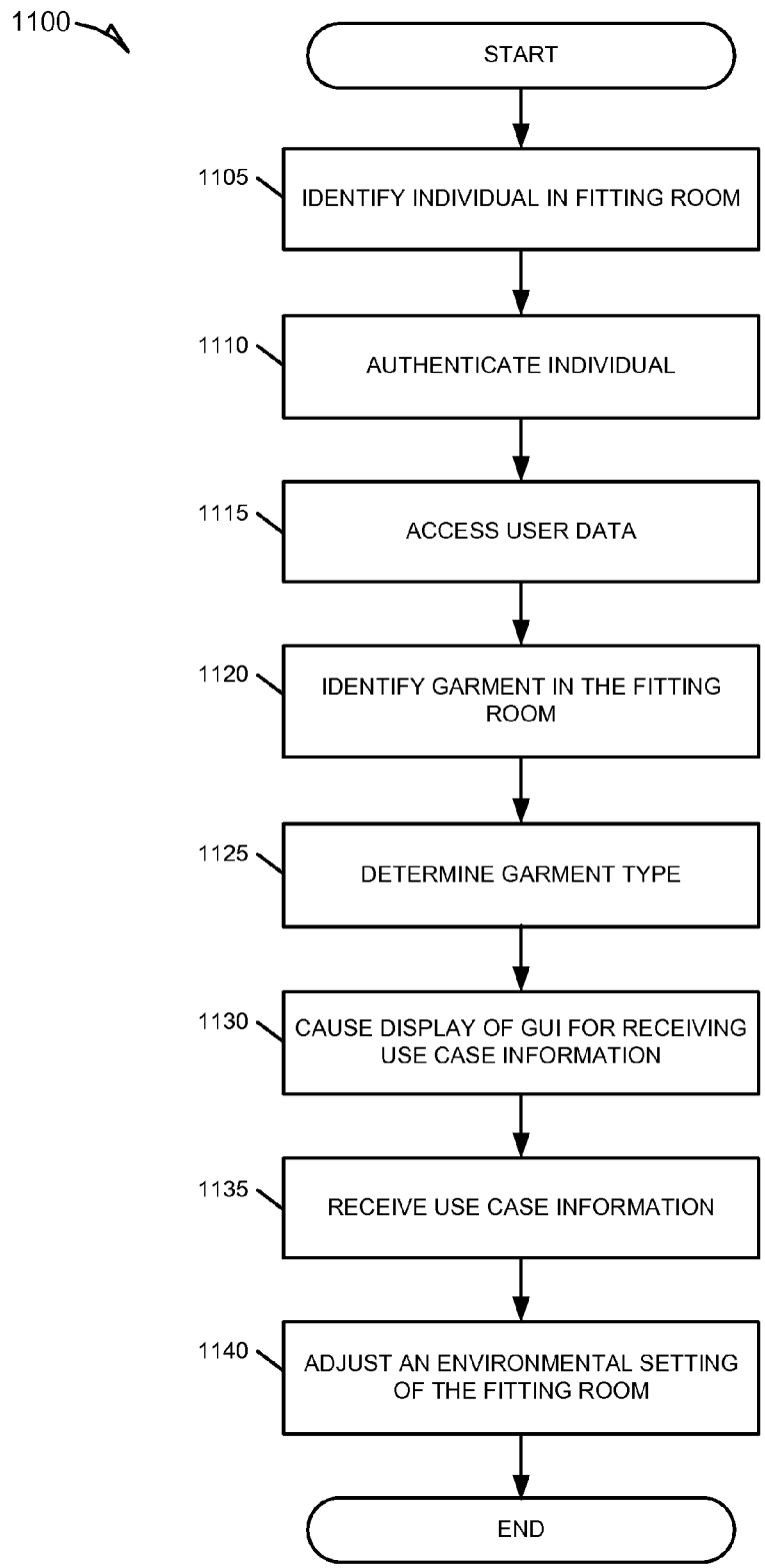
FIG. 11 is a flowchart illustrating a method for customizing environmental settings in a retail environment, consistent with some embodiments.

FIG. 11 is a flowchart illustrating a method 1100 for customizing environmental settings in a retail environment, consistent with some embodiments. The method 1100 may be embodied in computer-readable instructions for execution by a hardware component (e.g., a processor) such that the steps of the method 1100 may be performed in part or in whole by the functional components of the interactive mirror display 112, and accordingly, the method 1100 is described below, by way of example with reference thereto. However, it shall be appreciated that the method 1100 may be deployed on various other hardware configurations and is not intended to be limited to the interactive mirror display 112. Further, although specific references are made to a "fitting room," it shall be appreciated that a fitting room is merely an example of one of the many retail environments in which the method 1100 may be deployed.

At operation 1105, the authentication module 812 identifies an individual entering a fitting room (or other area of the retail store in which the interactive mirror display 112 is located). For example, the authentication module 812 may identify the individual based on an identifier (e.g., a name, username, or email address) provided by the individual or a sales associate using a GUI provided by the interface module 810 on the display unit 800. In another example, the authentication module 812 may identify the individual based on data received from the camera 804 or motion sensor 808. In yet another example, the authentication module 812 may work in conjunction with the RFID reader 806 to identify the individual using an identifier received from an RFID device worn by the individual.

At operation 1110, the authentication module 812 authenticates the individual in a manner consistent with the methodologies discussed herein. At operation 1115, the authentication module 812 accesses user data about the individual maintained as part of a user account of the individual. The user data may, for example, include user preferences, a purchase history, and items owned by the user.

At operation 1120, the identification module 814 identifies (or retrieves an identifier of) a garment brought into the fitting room by the individual or a sales associate providing assistance to the individual. For example, the identification module 814 may work in conjunction with the RFID reader 806 to obtain an identifier of the garment from an RFID tag attached thereto. Accordingly, the identification of the garment may include transmitting interrogator data to an RFID tag affixed to the garment, and receiving a response from the RFID tag that includes an identifier of the garment.

In another example, the identifying of the garment may be based on an analysis of image data received from the camera 804. The image data may include one or more image having visible depictions of the garment. As such, the identifying of the garment may include receiving the image data from the camera 804 and performing object recognition on the image data to identify the item and the individual according to one of several known image analysis and object recognition techniques (e.g., edge detection, edge matching, greyscale matching, gradient matching, or pattern recognition).

Upon identifying the garment, identification module 814 determines a garment type for the garment, at operation 1125. The garment type may be based on information about the garment maintained by the networked retail store system 100 (e.g., in database 108) or retrieved from the network-based marketplace 202 (e.g., in database 228) or a third party server 206. The garment type may include any one of a style, a color, or a brand.

At operation 1130, the interface module 810 causes display of a GUI operable to receive use case information from the individual. The use case information defines the individual's intended use for the garment (e.g., to be worn at a cocktail party or to be worn at in an office during work hours). The GUI may include a drop-down menu including a list of predefined use cases and an additional text field for entering a use case not included in the list of predefined use cases. The individual may select a single use case or a plurality of use cases. At operation 1135, the customization module 1016 receives the use case information specified by the individual using the GUI provided by the interface module 810.

At operation 1140, the customization module 826 adjusts one or more environmental settings of the fitting room based on any one of the user data, garment type, or use case information. For example, if the user preferences maintained as part of the user data indicate that the individual prefers certain lighting conditions when trying on clothes, the customization module 826 may cause the light array 126 to change to the preferred lighting conditions. As another example, if the garment type is a business suit, the customization module 826 may adjust one or more light settings and the background setting so as to produce an environment that mimics a professional office setting.

Consistent with some embodiments, the customization module 826 may adjust the environmental settings by transmitting machine-readable instructions to one or more components in the fitting room. For example, the customization module 826 may provide instructions to the light array 126 to adjust at least one light setting of the particular area. In another example, the customization module 826 may adjust a background setting by providing instructions to a video display wall that cause the video display wall (e.g., an interactive wall display 110) to display a particular background image content (e.g., an image or video).

Figure 12:
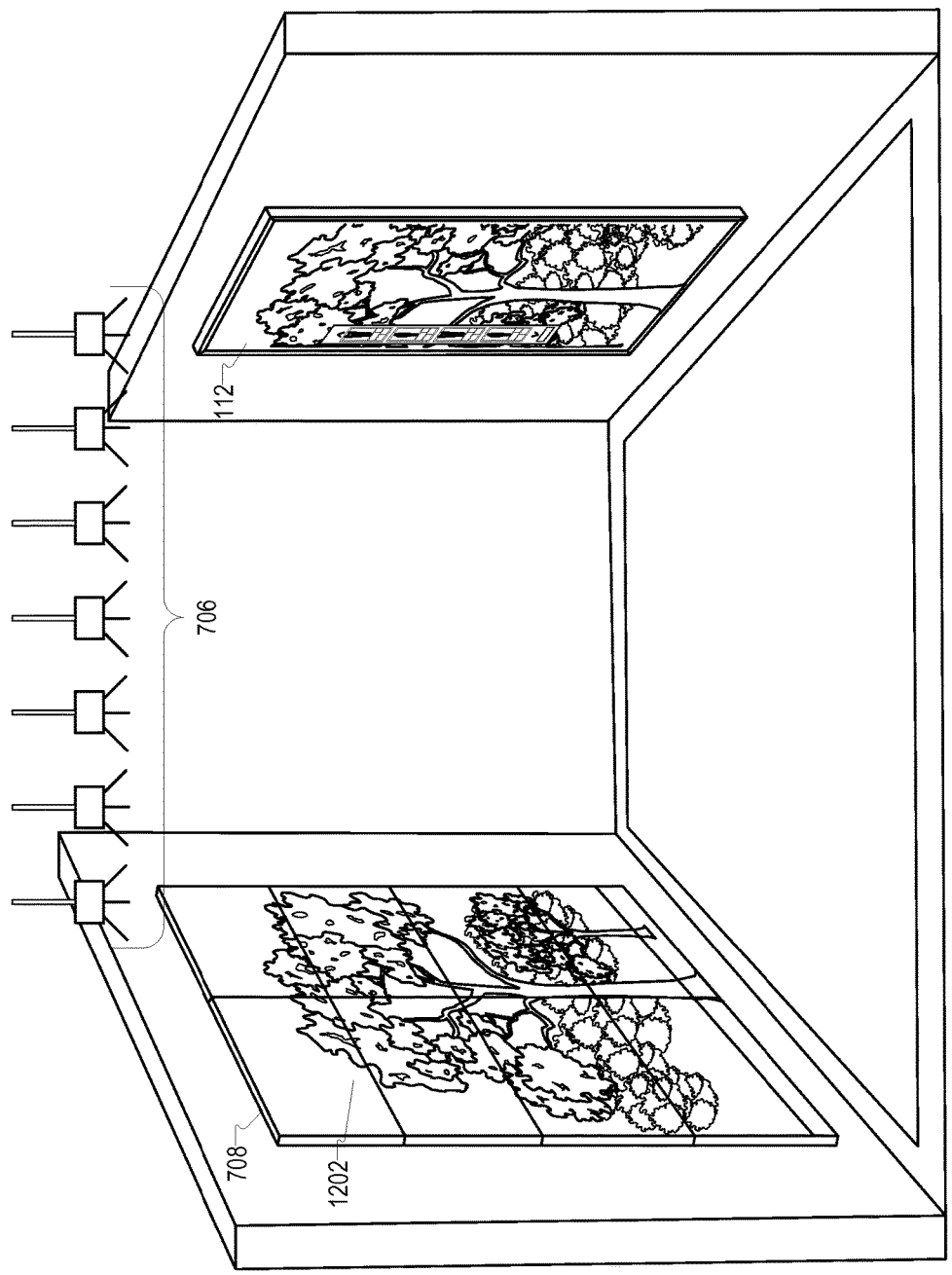
FIG. 12 is a diagram illustrating customization of the fitting room, depicted in FIG. 7, provided by the interactive mirror display, according to some example embodiments.

As an example of the operation of method 1100, FIG. 12 is a diagram illustrating the customization of the fitting room 700 provided by the interactive mirror display 112, according to some example embodiments. As shown, the light settings of the overhead light array 706 (e.g., an instances of the light array 126) have been adjusted and the background settings have been adjusted such that an image 1202 is presented on the video wall 708 (e.g., an instance of the interactive wall display 110), which in turn is reflected back by the interactive mirror display 112. In this example embodiment, the individual 704 (not shown) has specified that the intended use of the garment is for jogging in the park, and accordingly, the overhead light array 706 has been adjusted to produce bright light to mimic sunlight, and the video wall 708 has been configured to display a nature scene to mimic the environment of a park.

Figure 13:
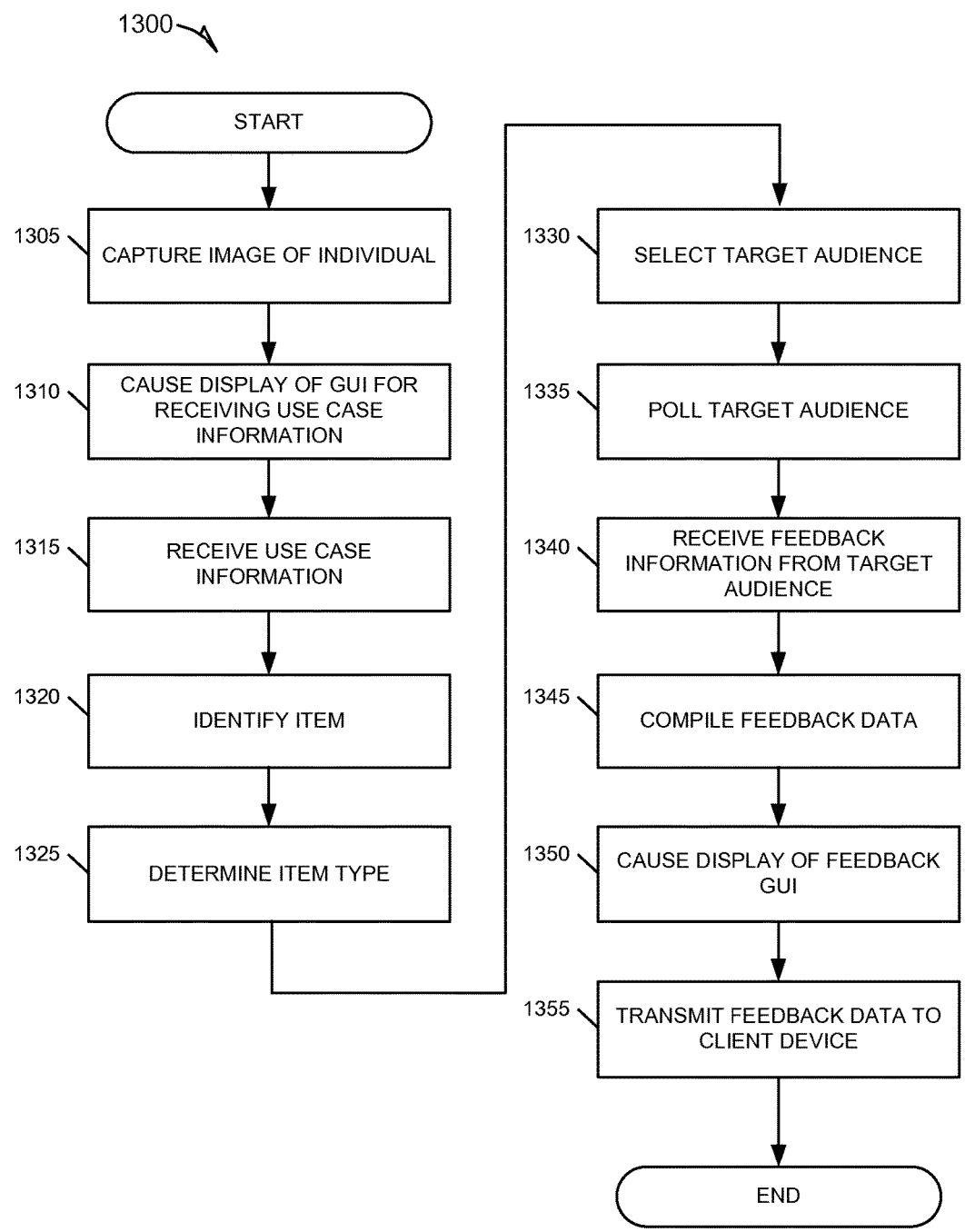
FIG. 13 is a flowchart illustrating a method for providing real-time feedback from a target audience regarding an item being tried on by an individual, consistent with some embodiments.

FIG. 13 is a flowchart illustrating a method 1300 for providing real-time feedback from a target audience regarding an item being tried on by an individual, consistent with some embodiments. The method 1300 may be embodied in computer-readable instructions for execution by a hardware component (e.g., a processor) such that the steps of the method 1300 may be performed in part or in whole by the functional components of the interactive mirror display 112, and accordingly, the method 1300 is described below, by way of example with reference thereto. However, it shall be appreciated that the method 1300 may be deployed on various other hardware configurations and is not intended to be limited to the interactive mirror display 112. Further, although specific references are made to a "fitting room," it shall be appreciated that a fitting room is merely an example of one of the many retail environments in which the method 1300 may be deployed.

At operation 1305, the social module 822 captures an image of an individual having an item of interest to the individual. For example, the social module 822 may, with the individual's permission, capture an image of the individual trying on a garment in a fitting room of the retail store. The social module 822 may capture the image from an image feed (e.g., a sequence of images) produced by the camera 804.

At operation 1310, the interface module 810 causes display of a user interface to receive use case information from the individual. The use case information specifies one or more intended uses of the item by the individual. The user interface may, for example, include a drop-down list of predefined use cases that may be selected by the individual to form the use case information. At operation 1315, the interface module 810 receives use case information specified from the user via the user interface.

At operation 1320, the identification module 814 identifies (or retrieves an identifier of) the item. For example, the identification module 814 may work in conjunction with the RFID reader 806 to obtain an identifier of the garment from an RFID tag attached thereto. Accordingly, the identification of the garment may include transmitting interrogator data to an RFID tag affixed to the garment, and receiving a response from the RFID tag that includes an identifier of the garment.

In another example, the identifying of the garment may be based on an analysis of the image of the individual with the item. As such, the identifying of the garment may include performing object recognition on the image to identify the item according to one of several known image analysis and object recognition techniques (e.g., edge detection, edge matching, greyscale matching, gradient matching, or pattern recognition).

Upon identifying the item, identification module 814 determines an item type of the item, at operation 1325. The item type may be based on information about the garment maintained by the networked retail store system 100 (e.g., in database 108), or retrieved from the network-based marketplace 202 (e.g., in database 228) or a third party server 206. The garment type may include any one of a style, a color, or a brand.

At operation 1330, the polling module 824 selects a target audience to poll for feedback related to the image of the individual with the item. Consistent with some embodiments, the target audience may be selected based on the use case information, the item type, or a combination of both. Accordingly, the selecting of the target audience may include identifying a plurality of users with a known experience related to the item type or the intended use of the item. The known experience may be based on information included in user data maintained as part of respective user accounts of the plurality of users. For example, the social module 822 may select a user to be part of the target audience based on the user having a history of transactions (either acting as the buyer or seller) with items of the item type. In another example, the social module 822 may select a user to be part of the target audience based on a known hobby or occupation of the user giving rise to experience with the use case.

In some embodiments, the target audience may be selected from a plurality of social network connections of the user included as part of the social data of the individual. Accordingly, the selecting of the target audience may include retrieving social data of the individual from one or more social networks that maintain a social network profile for the individual.

At operation 1335, the polling module 824 polls each member of the target audience for feedback regarding the image of the individual with the item. In some embodiments, the polling of the members of the target audience may include transmitting a message to client devices of the target audience that are executing applications designed to exchange data with the interactive mirror display 112. The message may include image data comprising the image and a field for entering feedback related to the image. Prior to transmitting the message to the target audience, the polling module 824 may distort aspects of the image of the individual (e.g., the face) so as to anonymize the individual's identity. In some embodiments, polling of the target audience includes transmitting machine-readable instructions to the computing device of each member of the target audience that causes presentation of the image and a survey related to the image.

At operation 1340, the polling module 824 receives feedback information from members of the target audience regarding the item. The feedback information may, for example, be textual comments, voice messages, video messages, a numerical rating, or a response to the survey. At operation 1345, the polling module 824 compiles feedback data from the feedback information received from the various members of the target audience. In embodiments in which the feedback information includes ratings, the compiling of the feedback data may include calculating an aggregate rating from the ratings received from the various members of the target audience.

At operation 1350, the interface module 810 causes display of a feedback GUI (e.g., on the display unit 800) that includes the feedback data. The feedback data may be presented to the individual in real-time as it is compiled. In instances in which the feedback data includes textual comments, textual responses to a survey, voice messages, or video messages, the feedback data may be presented in the manner in which it is received (e.g., as a plain unedited text comment). In instances in which the feedback is a numerical rating, the feedback data may be displayed within the feedback interface as a graphical representation of information such as a chart. At operation 1355, the communication module 816 transmits the feedback data to a client device of the individual.

Figure 14:
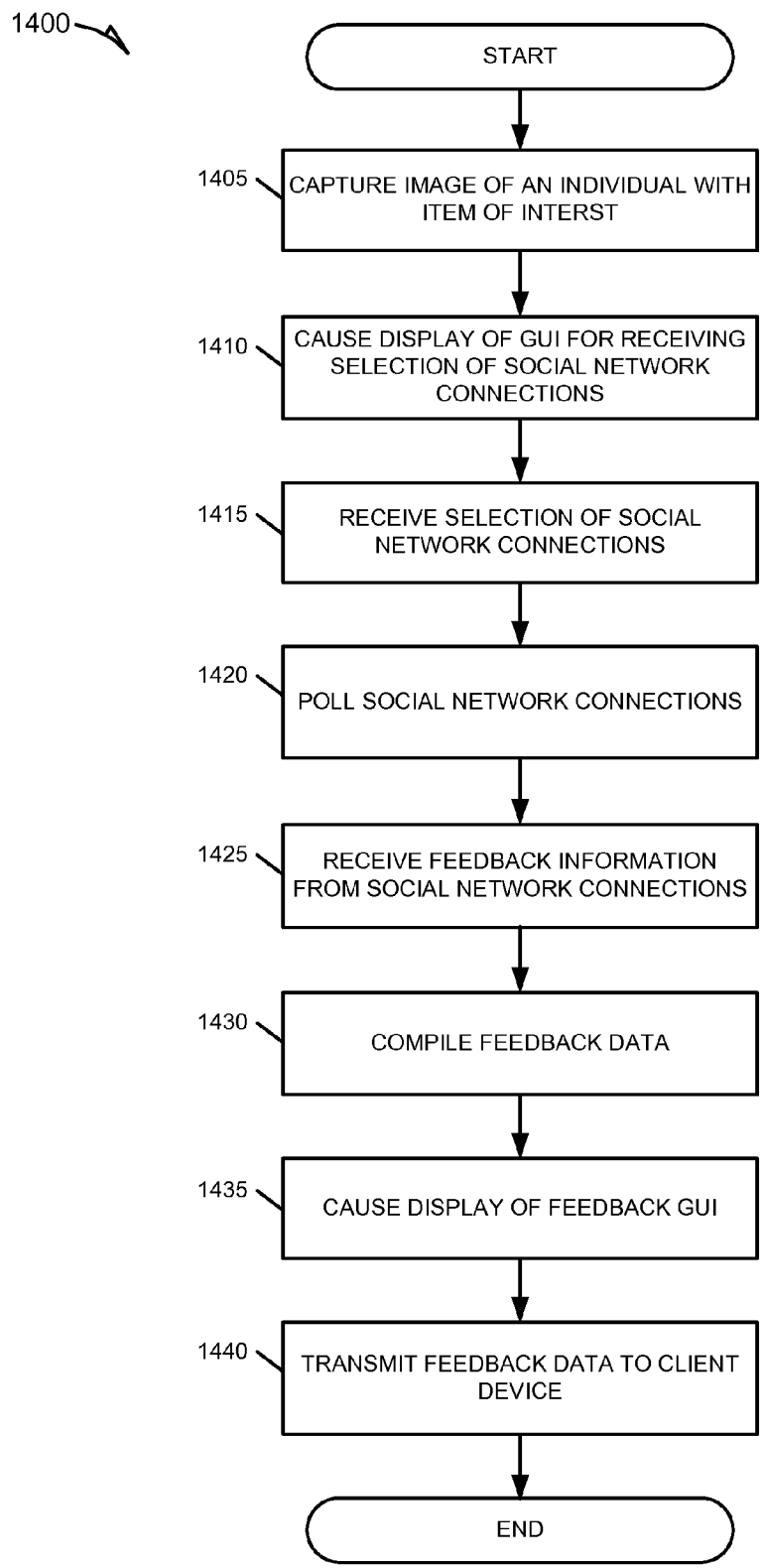
FIG. 14 is a flowchart illustrating a method for providing real-time feedback from a user-specified audience regarding an item being tried on by an individual, consistent with some embodiments.

FIG. 14 is a flowchart illustrating a method 1400 for providing real-time feedback from a user-specified audience regarding an item being tried on by an individual, consistent with some embodiments. The method 1400 may be embodied in computer-readable instructions for execution by a hardware component (e.g., a processor) such that the steps of the method 1400 may be performed in part or in whole by the functional components of the interactive mirror display 112, and accordingly, the method 1400 is described below, by way of example with reference thereto. However, it shall be appreciated that the method 1400 may be deployed on various other hardware configurations and is not intended to be limited to the interactive mirror display 112. Further, although specific references are made to a "fitting room," it shall be appreciated that a fitting room is merely an example of one of the many retail environments in which the method 1400 may be deployed.

At operation 1405, the social module 822 captures an image of an individual with an item of interest to the individual (e.g., from an image feed produced by the camera 804). At operation 1410, the interface module 810 causes display of a user interface for selecting social network connections of the individual to whom the individual wishes to share the image. At operation 1415, the interface module 810 receives a selection of one or more social network connections selected by the individual.

At operation 1420, the communication module 816 polls each social network connection selected by the individual for feedback regarding the image of the individual with the item. In some embodiments, the polling of the social network connections may include transmitting a message to client devices (e.g., of the social network connections) that are executing applications designed to exchange data with the interactive mirror display 112. The message may include image data comprising the image, and a field for entering feedback related to the image.

At operation 1425, the polling module 824 receives feedback information (e.g., from a image feed (e.g., a sequence of images) produced by the camera 804) from social network connections regarding the item. At operation 1430, the polling module 824 compiles feedback data from the feedback information received from the social network connections. At operation 1435, the interface module 810 causes display of a feedback GUI (e.g., on the display unit 800) that includes the feedback data. The feedback data may be presented to the individual in real-time as it is compiled. At operation 1440, the communication module 816 transmits the feedback data to a client device of the individual.

Figure 15:
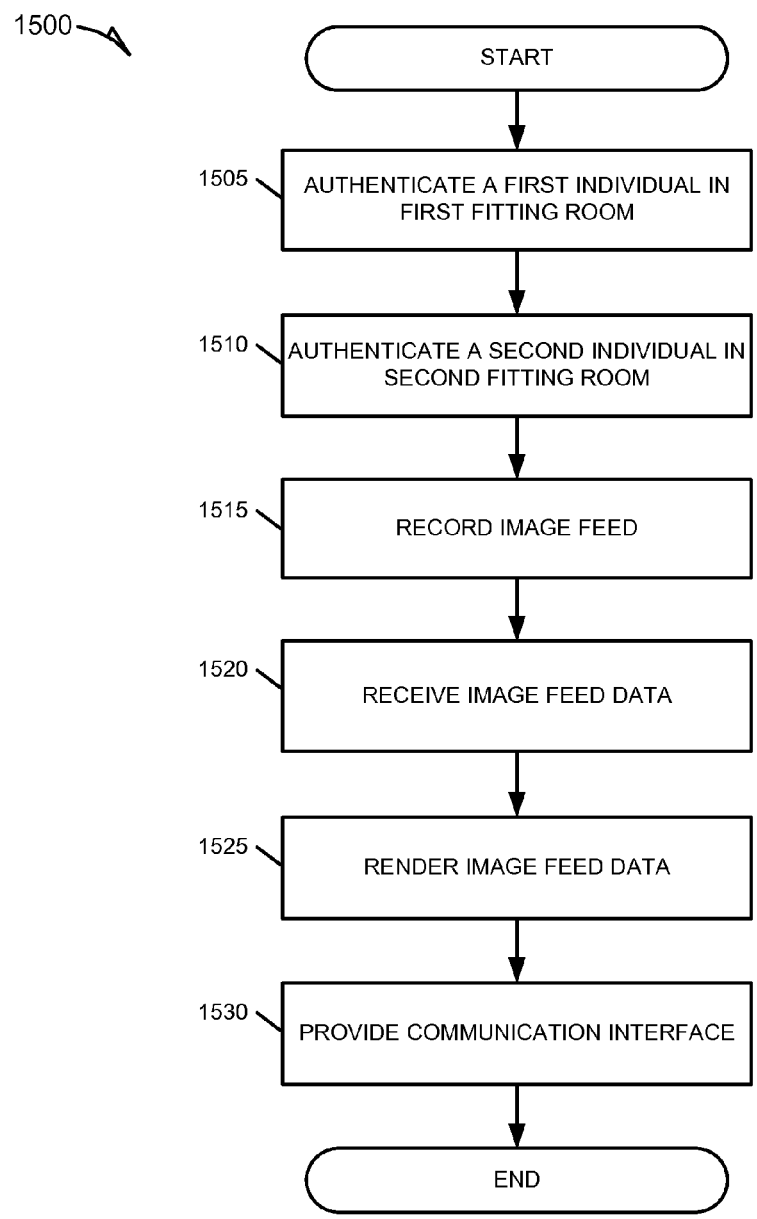
FIG. 15 is a flowchart illustrating a method for providing social shopping services at an interactive retail store, consistent with some embodiments.

FIG. 15 is a flowchart illustrating a method 1500 for providing social shopping services at an interactive retail store, consistent with some embodiments. The method 1500 may be embodied in computer-readable instructions for execution by one or more processors such that the steps of the method 1500 may be performed in part or in whole by the interactive mirror display 112. The method 1500 may be embodied in computer-readable instructions for execution by a hardware component (e.g., a processor) such that the steps of the method 1500 may be performed in part or in whole by the functional components of the interactive mirror display 112, and accordingly, the method 1500 is described below, by way of example with reference thereto. However, it shall be appreciated that the method 1500 may be deployed on various other hardware configurations and is not intended to be limited to the interactive mirror display 112. Further, although specific references are made to a "fitting room," it shall be appreciated that a fitting room is merely an example of one of the many retail environments in which the method 1500 may be deployed.

At operation 1505, an authentication module 812 of a first instance of the interactive mirror display 112 authenticates a first individual entering at a first fitting room. At operation 1510, an authentication module 812 of a second instance of the interactive mirror display 112 authenticates a second individual entering at a second fitting room. The second fitting room may be in the same retail store as the first fitting room or in another retail store. At operation 1515, the camera 804 of the first instance of the interactive mirror display 112 begins recording an image feed of the first fitting room where the first individual is located, and the camera 804 of the second instance of the interactive mirror display 112 begins recording an image feed of the second fitting room where the second individual is located. At operation 1520, the first instance of the interactive mirror display 112 receives image feed data comprising the image feed from the second instance of the interactive mirror display 112 and vice-versa.

At operation 1525, the first instance of the interactive mirror display 112 renders the image feed data received from the second instance of interactive mirror display 112 to display the image feed of the second fitting room where the second individual is located. The second interactive mirror display 112 may, simultaneously, render the image feed data received from the first interactive mirror display 112 to display the image feed of the first fitting room where the first individual is located. At operation 1530, a respective communication module 816 of the first and second interactive mirror displays 112 provides a communication interface between the first and second individuals. The communication interface may allow the first and second individuals to exchange text-based messages, or may enable voice communication between the first and second individuals.

Figure 16:
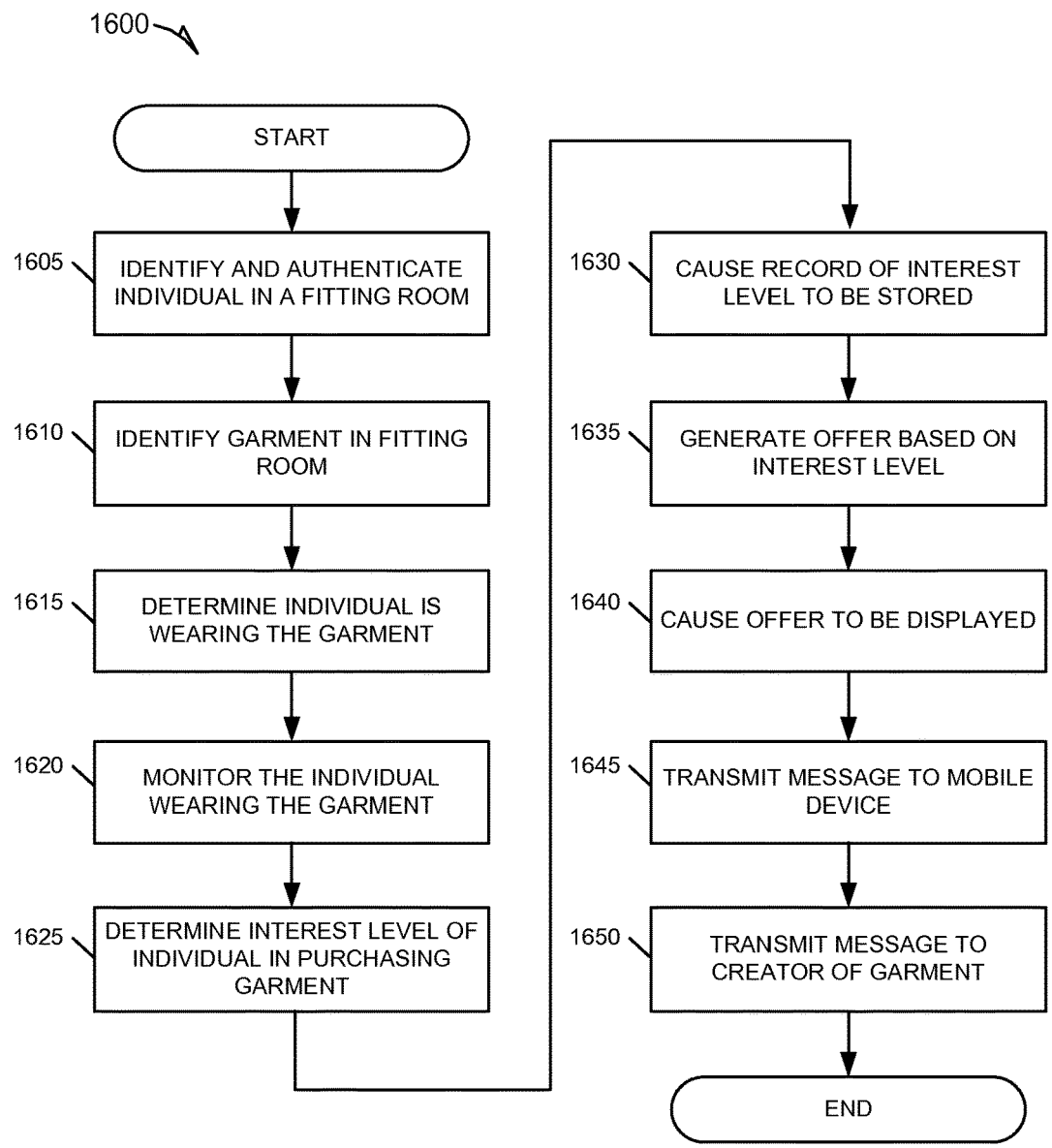
FIG. 16 is a flowchart illustrating a method for determining an interest level of an individual at an interactive retail store, consistent with some embodiments.

FIG. 16 is a flowchart illustrating a method 1600 for determining an interest level of an individual at an interactive retail store, consistent with some embodiments. The method 1600 may be embodied in computer-readable instructions for execution by a hardware component (e.g., a processor) such that the steps of the method 1600 may be performed in part or in whole by the functional components of the interactive mirror display 112, and accordingly, the method 1600 is described below, by way of example with reference thereto. However, it shall be appreciated that the method 1600 may be deployed on various other hardware configurations and is not intended to be limited to the interactive mirror display 112. Further, although specific references are made to a "fitting room," it shall be appreciated that a fitting room is merely an example of one of the many retail environments in which the method 1600 may be deployed.

At operation 1605, the authentication module 812 identifies and authenticates an individual in a fitting room. The individual may be identified and authenticated prior to or upon entering the fitting room. In identifying and authenticating the individual, the authentication module 812 may identify a user account of the individual (e.g., maintained by the network-based marketplace 202), and access user data maintained as part of the user account. The user data may include contact information (e.g., email address or phone number) for contacting the individual.

At operation 1610, the identification module 814 identifies (or retrieves an identifier of) a garment offered for sale by the retail store being brought into the fitting room by the individual or a sales associate providing assistance to the individual. For example, the identification module 814 may work in conjunction with the RFID reader 806 to obtain an identifier of the garment from an RFID tag attached thereto. Accordingly, the identification of the garment may include transmitting interrogator data to an RFID tag affixed to the garment, and receiving a response from the RFID tag that includes an identifier of the garment.

At operation 1615, the identification module 814 determines the individual is wearing the garment. The determination that the individual is wearing the garment may, for example, be based on a determined proximity of the individual with respect to the garment. For example, the determining that the individual is wearing the garment may be based on a signal produced by an RFID tag affixed to the garment. For instance, based on the known strength of signals produced by an RFID tag affixed to the garment and another RFID tag associated with the individual (e.g., embedded in a wearable device), the identification module 814 may determine that the individual is within a predefined distance of the garment.

Consistent with some embodiments, the identification module 814 determines that the individual is wearing the garment based on an analysis of image data received from the camera 804. The image data may include one or more images having visible depictions of the individual wearing the garment. As such, the determining that the individual is wearing the garment may include: receiving the image data from the one or more cameras; performing object recognition on the image data according to one of several known image analysis and object recognition techniques (e.g., edge detection, edge matching, greyscale matching, gradient matching, or pattern recognition) to identify the garment being worn by the individual.

At operation 1620, the feedback module 818 monitors the individual wearing the garment, and determines an amount of time the garment is worn by the individual. For example, the feedback module 818 may measure the amount of time between determining that the individual is wearing the garment and determining that the individual is no longer wearing the garment (e.g., based on an RFID signal associated with the garment).

At operation 1625, the feedback module 818 determines an interest level of the individual in purchasing the garment based on the amount of time the individual wears the garment. Consistent with some embodiments, in determining the interest level of the individual, the feedback module 818 may access a look up table (e.g., from the database 108 or 228) having a plurality of predefined interest levels (e.g., "not interested," "interested," "very interested") that are mapped to a corresponding time range. The feedback module 818 may then identify the time range corresponding to the amount of time the individual wore the garment, and select the corresponding predefined interest level as the interest level of the individual. For example, in accordance with information included in the look-up table, the individual wearing the garment for two or more minutes may result in a determination by the feedback module 818 that the individual is "very interested" in the garment. At operation 1630, the feedback module 818 causes a record of the interest level of the individual in purchasing the garment to be stored as part of the user data maintained as part of the user account of the individual.

At operation 1635, the recommendation module 820 generates an offer for the individual based on the determined interest level. Consistent with some embodiments, the offer may include a coupon or discount on the purchase price of the garment. The value of the offer may be based on the amount of time the individual wears the garment or on the determined interest level in purchasing the garment. In some embodiments, the value of the offer may be inversely proportional to the amount of time the individual wears the garment or on the determined interest level in purchasing the garment. In other words, as the amount of time the user wears the garment increases, the amount of the discount may decrease. In this manner, individuals with a lower interest in purchasing a garment will be more incentivized (by way of the discount) to purchase the garment as a result of the increased discount value.

Consistent with some embodiments, the generating of the offer by the recommendation module 820 may include generating one or more recommendations for garments that are similar (e.g., other colors, sizes, or styles) or related (e.g., accessories) to the garment. In some embodiments, the offer may include generating a recommendation in response to determining that the interest level of the individual is above a predefined threshold.

At operation 1640, the interface module 810 causes the offer to be displayed to the individual (e.g., on the display unit 800). At operation 1645, the communication module 816 transmits a message to a computer device of the individual (e.g., client device 204) using the contact information included in the user data of the individual. The message may, for example, be an email or text message that includes the offer. In addition to the offer, the message may provide information about the garment and provide a mechanism whereby the individual may cause garment (among other items) to be added to an electronic shopping cart (e.g., provided by shopping cart module 310), at which point the payment application 224 may facilitate the purchase of the items added to the electronic shopping cart by the individual.

At operation 1650, the interactive mirror display 112 transmits an additional message to a creator (e.g., a designer or manufacturer) of the garment. The additional message may identify the garment and include the amount of time the individual wore the garment, the determined level of interest, and an indication of whether the individual purchased the item.

Figure 17:
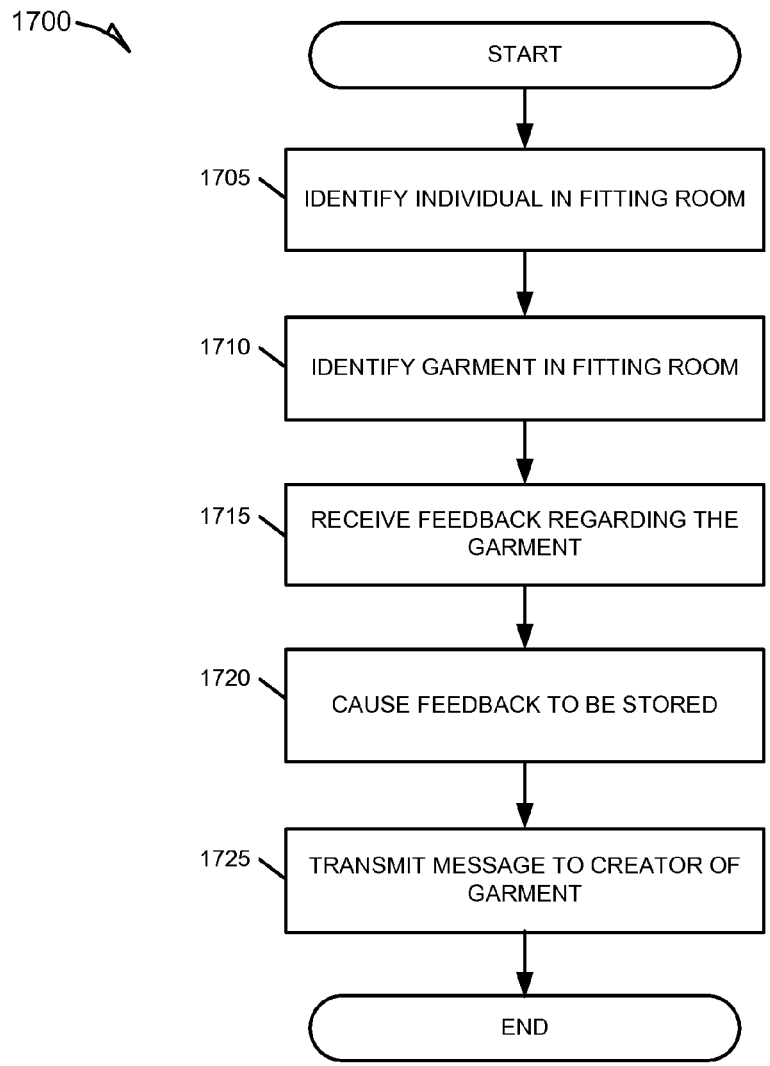
FIG. 17 is a flowchart illustrating a method for provisioning feedback received from an individual at an interactive retail store, consistent with some embodiments.

FIG. 17 is a flowchart illustrating a method 1700 for provisioning feedback received from an individual at an interactive retail store, consistent with some embodiments. The method 1700 may be embodied in computer-readable instructions for execution by a hardware component (e.g., a processor) such that the steps of the method 1700 may be performed in part or in whole by the functional components of the interactive mirror display 112, and accordingly, the method 1700 is described below, by way of example with reference thereto. However, it shall be appreciated that the method 1700 may be deployed on various other hardware configurations and is not intended to be limited to the interactive mirror display 112. For example, the method 1700 may be embodied in computer-readable instructions for execution by one or more processors such that the steps of the method 1700 may be performed in part or in whole by the interactive display wall 110, or the interactive product display 114. Further, although specific references are made to a "fitting room," it shall be appreciated that a fitting room is merely an example of one of the many retail environments in which the method 1700 may be deployed.

At operation 1705, the authentication module 812 identifies and authenticates an individual in a fitting room. At operation 1710, the identification module 814 identifies (or retrieves an identifier of) a garment brought into the fitting room by the individual or a sales associate providing assistance to the individual.

At operation 1715, the interface module 810 receives feedback regarding the garment. The feedback may be received directly by the interactive mirror display 112 (e.g., on the touch-capacitive surface), from a sales associate using the sales associate application 122 executing on the sales associate device 120, or from the client device of the individual. Accordingly, the receiving of feedback regarding the garment may include causing display (e.g., on the display unit 800) of a feedback interface to receive feedback regarding the garment.

At operation 1720, the interface module 810 causes the received feedback to be stored (e.g., in database 108 or database 228) and maintained as part of user data about the individual. At operation 1725, the communication module 816 transmits a message to a creator (e.g., a designer or manufacturer) of the garment that includes the received feedback.

Figure 18:
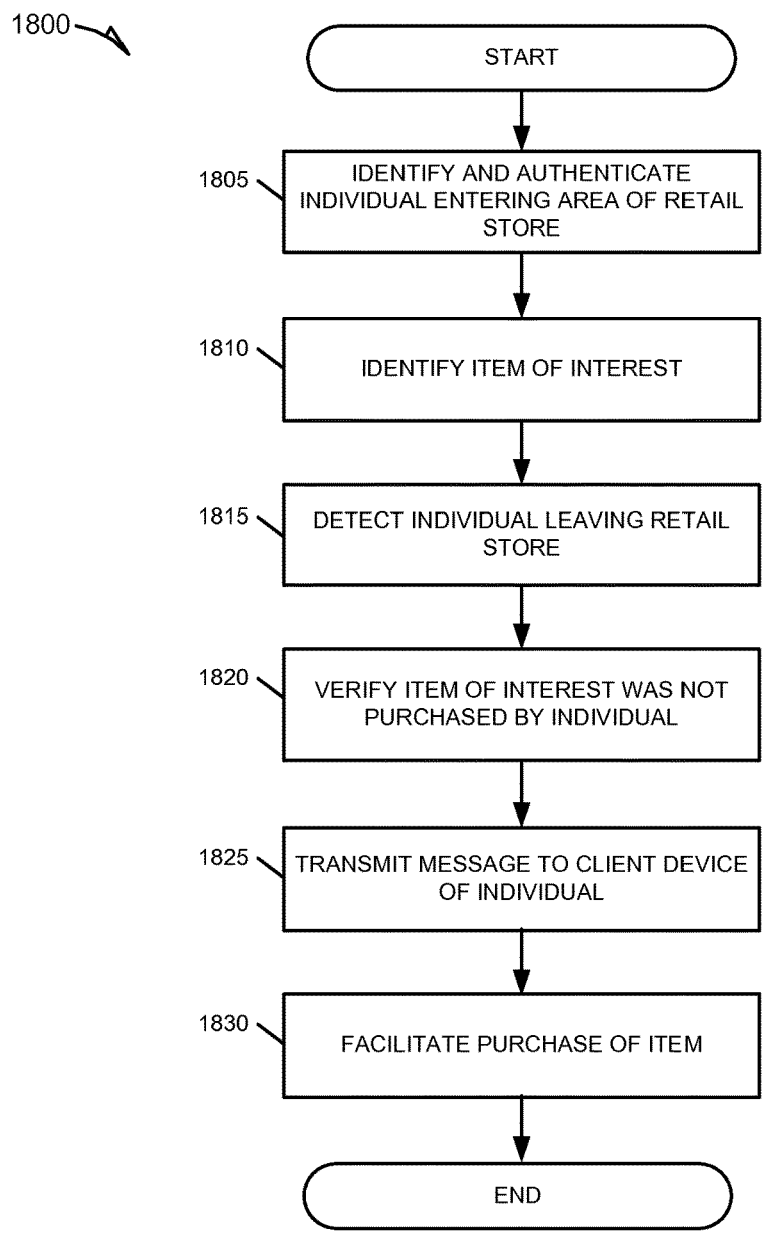
FIG. 18 is a flowchart illustrating a method for facilitating a transaction after an individual has left a retail store, consistent with some embodiments.

FIG. 18 is a flowchart illustrating a method 1800 for facilitating a transaction after an individual has left a retail store, consistent with some embodiments. The method 1800 may be embodied in computer-readable instructions for execution by one or more processors such that the steps of the method 1800 may be performed in part or in whole by the functional components of the networked retail store system 100 discussed in FIGS. 1 and 2, and accordingly, the method 1800 is described below, by way of example with reference thereto. However, it shall be appreciated that the method 1800 may be deployed on various other hardware configurations and is not intended to be limited to the functional components of the networked retail store system 100.

At operation 1805, the authentication module 812 identifies and authenticates an individual entering a particular area of a retail store (e.g., a fitting room). Consistent with some embodiments, the authentication of the individual may include identifying a user account of the individual (e.g., maintained by the networked retail store system 100 or the network-based marketplace 202) and accessing user data maintained as part of the user account. The user data may include contact information (e.g., an email address or phone number) for contacting the individual.

At operation 1810, the identification module 814 identifies an item of interest to an individual at a retail store. The item of interest may be identified based on the individual looking at the item (e.g., based on his presence in front of the item as determined by data received from the camera 804 or the motion sensor 808), the individual picking up or holding the item, or the individual bringing the item into a fitting room or other retail environment in which an interactive mirror display 112 is located.

At operation 1815, the networked retail store system 100 detects the individual leaving the retail store. The detecting of the individual leaving the retail store may be based on information received from motion sensors 808, geo-position information received from the client device 204 of the individual, image data received from an in-store camera (e.g., the camera 804), or a strength of a signal produced by one or more antennas (e.g., Bluetooth or WiFi) of the client device 204.

At operation 1820, the inventory module 104 verifies that the item of interest was not purchased by the individual. The verifying of the item of interest not being purchased by the individual may include accessing transaction and inventory data maintained in the database 108, for example.

In response to detecting the individual leaving the retail store without having purchased the item, the communication module 806 transmits a message to the client device 204, at operation 1825. The message may include a reminder to the individual of the one or more items of interest. The message may also provide detailed product information about the item and provide a mechanism whereby the individual may cause the one or more items to be added to an electronic shopping cart (e.g., provided by shopping cart module 310).

Consistent with some embodiments, the message may include one or more recommendations for items that are similar or related to the item of interest. Accordingly, prior to sending the message, the recommendation module 820 generates the item recommendations based on the detailed product information for the item of interest as well as user data (e.g., user preferences) maintained as part of the user account of the individual.

Consistent with some embodiments, the message may include one or more offers related to the item of interest. For example, the message may include a discount that is applicable to a price of the item of interest. The value of the offer may, for example, be based on an amount of time the individual wears the garment or on a determined interest level of the individual in purchasing the garment. In some embodiments, the value of the offer may be inversely proportional to the amount of time the individual wears the garment or on the determined interest level in purchasing the garment.

At 1830, the payment application 224 facilitates the purchase of the item of interest. In some embodiments, the facilitating of the purchase includes receiving a request to add the item of interest to an electric shopping cart associated with the individual, wherein the request is generated in response to receiving a user selection of a selectable element (e.g., a button) included in the message. The facilitating of the purchase may further include causing an instance of the item of interest to be added to the electric shopping cart, and facilitating the transfer of funds from an account of the individual to an account associated with the retail store. Upon completing the purchase, the individual may be provided with the option to have the one or more items delivered or to pick them up from the retail store.

Figure 19:
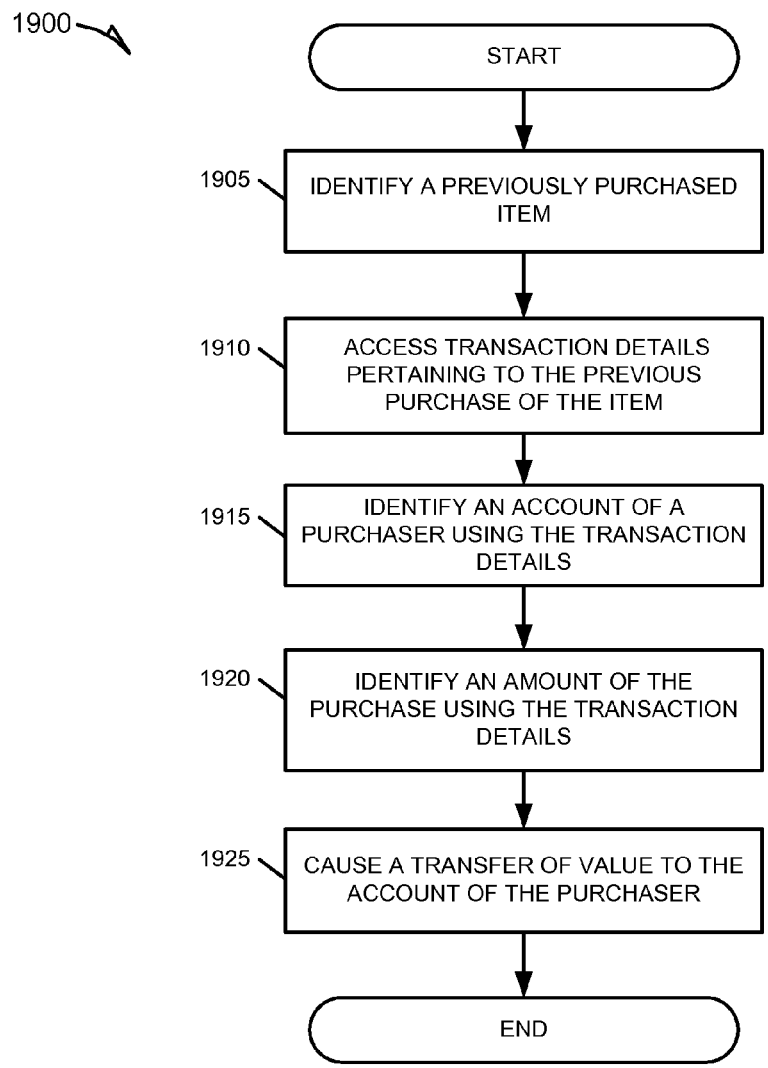
FIG. 19 is a flowchart illustrating a method for facilitating a return of a purchased item, consistent with some embodiments.

FIG. 19 is a flowchart illustrating a method 1900 for facilitating a return of a purchased item, consistent with some embodiments. The method 1900 may be embodied in computer-readable instructions for execution by one or more processors such that the steps of the method 1900 may be performed in part or in whole by the functional components of the networked retail store system 100 discussed in FIGS. 1 and 2, and accordingly, the method 1900 is described below, by way of example with reference thereto. However, it shall be appreciated that the method 1900 may be deployed on various other hardware configurations and is not intended to be limited to the functional components of the networked retail store system 100. Further, in some embodiments, the method 1900 may be initiated in response to an individual placing a previously purchased item into a designated return slot, bin, or container that includes the networked RFID reader 124.

At operation 1905, the networked RFID reader 124 identifies a previously purchased item based on information received from an RFID tag affixed to the item. Responsive to the item being identified, the retail store server 102 accesses stored transaction details (e.g., a data, an amount, an account identifier) pertaining to the previous purchase of the item, at operation 1910. At operation 1915, the retail store server 102 identifies an account of the individual who purchased the item using the transaction details. At operation 1920, the retail store server 102 may identify an amount of the purchase using the transaction details. At operation 1925, the retail store server 102 causes a transfer of value (e.g., the amount of the previous purchase) to the account of the individual.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture

Figure 20:
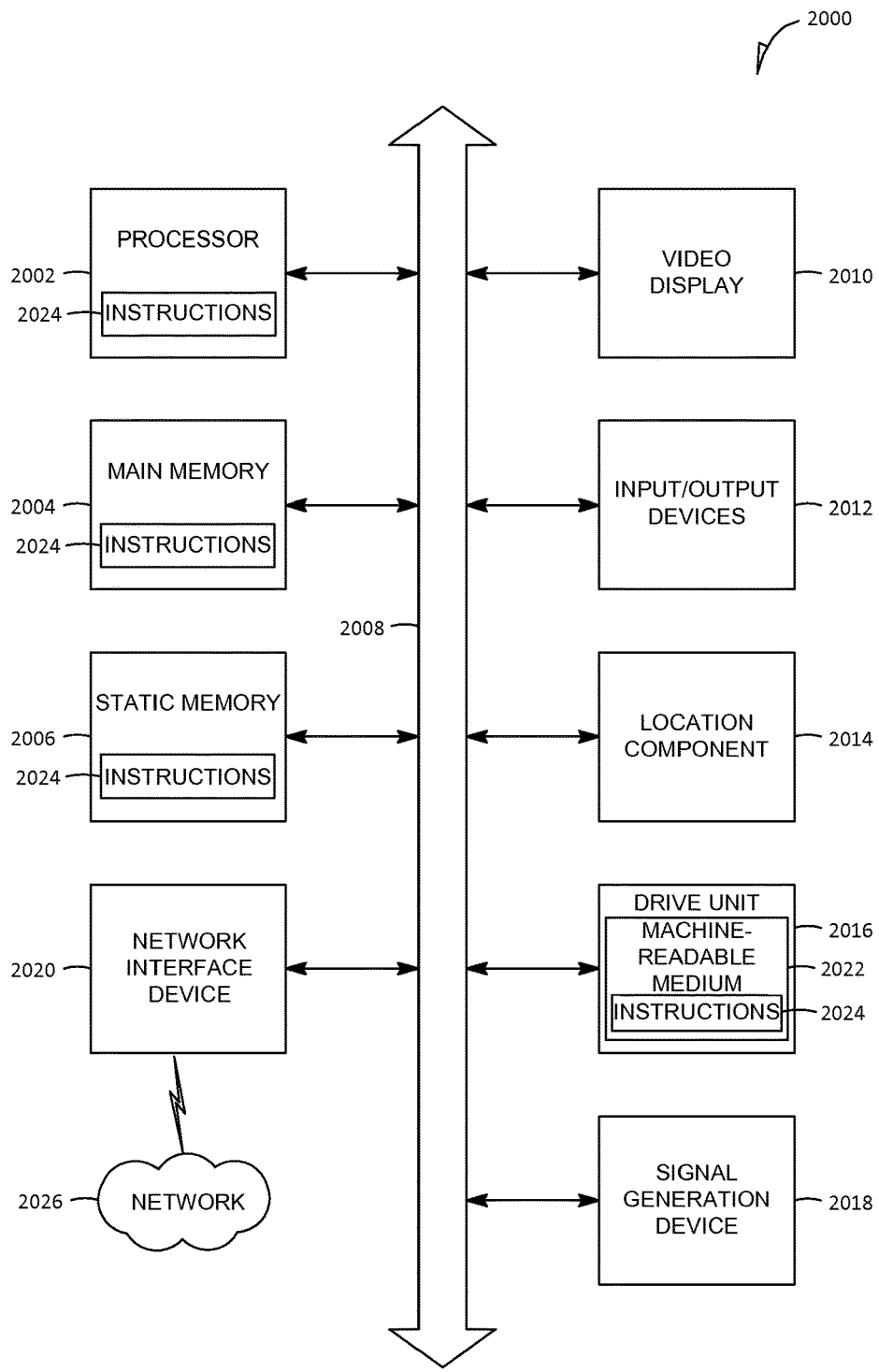
FIG. 20 is a diagrammatic representation of a machine in the example form of a computer system within which a set of instructions for causing the machine to perform any one or more of the methodologies discussed herein may be executed.

FIG. 20 is a diagrammatic representation of a machine in the example form of a computer system 2000 within which a set of instructions 2024 for causing the machine to perform any one or more of the methodologies discussed herein may be executed. The computer system 2000 may correspond to the retail store server 102, sales associate device 120, controller 802, client device 204, the third party server 206, the API server 216, the web server 218, or the application server 220, consistent with some embodiments. The computer system 2000 may include instructions 2024 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a personal digital assistant (PDA), a cellular telephone, a smart phone (e.g., iPhone®), a tablet computer, a web appliance, a handheld computer, a desktop computer, a laptop or netbook, a set-top box (STB) such as those provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor 2002 (e.g., a central processing unit (CPU), a graphics processing unit (GPU), or both), a main memory 2004, and a static memory 2006, which communicate with each other via a bus 2008. The computer system 2000 may further include a video display 2010 (e.g., a liquid crystal display (LCD) or a cathode ray tube (CRT)). The computer system 2000 also includes one or more input/output (I/O) devices 2012, a location component 2014, a drive unit 2016, a signal generation device 2018 (e.g., a speaker), and a network interface device 2020. The I/O devices 2012 may, for example, include a keyboard, a mouse, a keypad, a multi-touch surface (e.g., a touchscreen or track pad), a microphone, a camera, and the like.

The location component 2014 may be used for determining a location of the computer system 2000. In some embodiments, the location component 2014 may correspond to a GPS transceiver that may make use of the network interface device 2020 to communicate GPS signals with a GPS satellite. The location component 2014 may also be configured to determine a location of the computer system 2000 by using an Internet Protocol (IP) address lookup or by triangulating a position based on nearby mobile communications towers. The location component 2014 may be further configured to store a user-defined location in the main memory 2004 or the static memory 2006. In some embodiments, a mobile location-enabled application may work in conjunction with the location component 2014 and the network interface device 2020 to transmit the location of the computer system 2000 to an application server or third party server for the purpose of identifying the location of a user operating the computer system 2000.

In some embodiments, the network interface device 2020 may correspond to a transceiver and antenna. The transceiver may be configured to both transmit and receive cellular network signals, wireless data signals, or other types of signals via the antenna, depending on the nature of the computer system 2000.

Machine-Readable Medium

The drive unit 2016 includes a machine-readable medium 2022 on which is stored one or more sets of data structures and instructions 2024 (e.g., software) embodying or used by any one or more of the methodologies or functions described herein. The instructions 2024 may also reside, completely or at least partially, within the main memory 2004, the static memory 2006, and/or the processor 2002 during execution thereof by the computer system 2000, with the main memory 2004, the static memory 2006, and the processor 2002 also constituting machine-readable media.

Consistent with some embodiments, the instructions 2024 may relate to the operations of an operating system (OS). Depending on the particular type of the computer system 2000, the OS may, for example, be the iOS® operating system, the Android® operating system, a BlackBerry® operating system, the Microsoft® Windows® Phone operating system, Symbian® OS, or webOS®. Further, the instructions 2024 may relate to operations performed by applications (commonly known as "apps"), consistent with some embodiments. One example of such an application is a mobile browser application that displays content, such as a web page or a user interface using a browser.

While the machine-readable medium 2022 is shown in an example embodiment to be a single medium, the term "machine-readable medium" may include a single medium or multiple media (e.g., a centralized or distributed database, and/or associated caches and servers) that store the one or more data structures or instructions. The term "machine-readable medium" shall also be taken to include any tangible medium that is capable of storing, encoding, or carrying instructions (e.g., the instructions 2024) for execution by the machine and that cause the machine to perform any one or more of the methodologies of the present disclosure, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 2024 may further be transmitted or received over a network 2026 using a transmission medium. The instructions 2024 may be transmitted using the network interface device 2020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying the instructions 2024 for execution by the machine, and includes digital or analog communications signals or other intangible media to facilitate communication of such software.

Although the embodiments of the present inventive subject matter have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A method comprising:
    detecting one or more characteristics of a human proximate an interactive mirror display, the interactive mirror display having a mirrored surface and at least one portion to selectively display a user interface;
    identifying a user profile that corresponds to the human based on a comparison of the one or more characteristics to data of user profiles that describes characteristics of humans associated with the user profiles;
    initiating an interaction session with the interactive mirror display based on the identifying;
    tracking, during the interaction session, interactions of the human proximate the interactive mirror display involving at least one item from a product database;
    determining an interest level of the human in the at least one item by comparing an amount of time the human interacts with the at least one item to time ranges of a lookup table, the time ranges each corresponding to a different interest level of a plurality of predefined interest levels;
    updating the user profile to include session data describing one or more of the interactions and the interest level of the human in the at least one item;
    determining a configuration of the user interface for display based on the updated user profile and product information from the product database describing the at least one item; and
    causing the at least one portion of the interactive mirror display to display the configuration of the user interface, including transitioning the at least one portion from a first mode of operation in which the at least one portion functions as the mirrored surface to a second mode of operation in which the at least one portion functions as a display surface operable to display the configuration.

2. The method as recited in claim 1, wherein identifying the user profile that corresponds to the human is based on facial recognition such that the one or more characteristics comprise a detected face of the human and the data of the user profiles comprises images of respective faces.

3. The method as recited in claim 1, wherein:
detecting the one or more characteristics comprises detecting a mobile device located proximate the human; and
identifying the user profile that corresponds to the human is based on a comparison of the detected mobile device to mobile devices associated with the user profiles.

4. The method as recited in claim 1, wherein:
the user profile includes data describing one or more items of interest to a user of the user profile that are sold at a retail store associated with the interactive mirror display, the one or more items of interest identified based on previous interactions of the user with digital content having information about the one or more items; and
the configuration of the user interface is further determined based on the one or more items of interest.

5. The method as recited in claim 1, further comprising:
identifying the at least one item as being worn by the human; and
retrieving the product information from the product database, the configuration of the user interface including at least some of the product information.

6. The method as recited in claim 1, further comprising identifying the at least one item based on a signal produced by a radio frequency identification (RFID) tag affixed to the at least one item.

7. The method as recited in claim 1, further comprising:
capturing an image of the human interacting with the at least one item;
transmitting a message to one or more computing devices associated with a target audience, the message including the image and a prompt to provide feedback related to the image;
receiving the feedback related to the image from the one or more computing devices associated with the target audience; and
updating the configuration of the user interface to present at least a portion of the feedback.

8. The method as recited in claim 7, further comprising anonymizing an identity of the human by distorting at least a portion of the image.

9. The method as recited in claim 8, wherein the identity is anonymized prior to transmitting the message.

10. The method as recited in claim 1, wherein the at least one portion of the interactive mirror display is further operable as a touch display surface in the second mode of operation and the configuration of the user interface includes interactive elements in relation to which user input can be received to provide feedback about the at least one item.

11. The method as recited in claim 1, wherein the interest level is further determined by mapping the amount of time the human interacts with the at least one item to one of the plurality of predefined interest levels based on the comparing.

12. A system comprising:
an interactive mirror display having a mirrored surface and at least one portion to selectively display a user interface by transitioning from a first mode of operation in which the at least one portion functions as the mirrored surface to a second mode of operation in which the at least one portion functions as a display surface operable to display a determined configuration of the user interface; and
a controller, implemented by at least one processor, communicatively coupled to the interactive mirror display, the controller implemented to perform operations comprising:
identifying a user profile that corresponds to a human detected proximate the interactive mirror display;
initiating an interaction session with the interactive mirror display based on identification of the human and tracking, during the interaction session, interactions of the human proximate the interactive mirror display involving at least one item from a product database;
determining an interest level of the human in the at least one item by comparing an amount of time the human interacts with the at least one item to time ranges of a lookup table, the time ranges each corresponding to a different interest level of a plurality of predefined interest levels;
updating the user profile to include session data describing one or more of the interactions and the interest level; and
determining a configuration of the user interface for display based on the updated user profile and product information from the product database describing the at least one item and causing the at least one portion to display the configuration of the user interface.

13. The system as recited in claim 12, wherein the operations further comprise transmitting a message to one or more computing devices associated with a target audience, the message including an image of the human interacting with the at least one item and a prompt to provide feedback related to the image.

14. The system as recited in claim 13, wherein the operations further comprise distorting one or more aspects of the image to anonymize an identity of the human prior to transmitting the message.

15. The system as recited in claim 13, wherein the operations further comprise receiving the feedback related to the image from the one or more computing devices associated with the target audience and updating the configuration of the user interface to present at least a portion of the feedback.

16. The system as recited in claim 12, wherein the operations further comprise identifying the at least one item involved in the interactions.

17. The system as recited in claim 16, wherein the operations further comprise:
identifying the at least one item as being worn by the human; and
retrieving the product information from the product database responsive to identification that the at least one item is worn by the human.

18. A non-transitory machine-readable storage medium having instructions stored thereon that are executable by processors of at least one computing device to cause the at least one computing device to perform operations comprising:
identifying a user profile that corresponds to a human detected proximate an interactive mirror display, the interactive mirror display having a mirrored surface and at least one portion to selectively display a user interface;
initiating an interaction session with the interactive mirror display based on the identifying;

tracking, during the interaction session, interactions of the human proximate the interactive mirror display involving at least one item from a product database;

determining an interest level of the human in the at least one item by comparing an amount of time the human interacts with the at least one item to time ranges of a lookup table, the time ranges each corresponding to a different interest level of a plurality of predefined interest levels;

updating the user profile to include session data describing one or more of the interactions and the interest level;

determining a configuration of the user interface for display based on the updated user profile and product information from the product database describing the at least one item; and causing the at least one portion of the interactive mirror display to display the configuration of the user interface, including transitioning the at least one portion from a first mode of operation in which the at least one portion functions as the mirrored surface to a second mode of operation in which the at least one portion functions as a display surface operable to display the configuration.

19. The machine-readable storage medium as recited in claim 18, wherein the operations further include:

capturing an image of the human interacting with the at least one item;

transmitting a message to one or more computing devices associated with a target audience, the message including the image and a prompt to provide feedback related to the image;

receiving the feedback related to the image from the one or more computing devices associated with the target audience; and updating the configuration of the user interface to present at least a portion of the feedback.

20. The machine-readable storage medium as recited in claim 18, wherein the at least one portion of the interactive mirror display is further operable as a touch display surface in the second mode of operation and the configuration of the user interface includes interactive elements in relation to which user input can be received to provide feedback about the at least one item.

\* \* \* \* \*